(12) United States Patent
Paoluccio et al.

(10) Patent No.: US 8,217,212 B2
(45) Date of Patent: *Jul. 10, 2012

(54) SEQUENCING RETORT LIQUID PHASE TORREFICATION PROCESSING APPARATUS AND METHOD

(76) Inventors: John A. Paoluccio, Modesto, CA (US); John J. Paoluccio, Modesto, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 12/489,763

(22) Filed: Jun. 23, 2009

(65) Prior Publication Data
US 2010/0251616 A1 Oct. 7, 2010

Related U.S. Application Data

(60) Provisional application No. 61/165,641, filed on Apr. 1, 2009.

(51) Int. Cl.
*C10G 1/00* (2006.01)
*C10B 53/00* (2006.01)

(52) U.S. Cl. ............ 585/242; 585/240; 201/21; 201/28; 44/606; 44/629

(58) Field of Classification Search .................... 201/21, 201/28; 585/240, 242; 44/606, 629
See application file for complete search history.

(56) References Cited

U.S. PATENT DOCUMENTS

| | | | | |
|---|---|---|---|---|
| 7,438,785 | B2 * | 10/2008 | Meier et al. | 201/21 |
| 7,748,653 | B2 * | 7/2010 | Palm | 241/27 |
| 7,857,943 | B2 * | 12/2010 | Noto | 201/21 |
| 7,942,942 | B2 * | 5/2011 | Paoluccio | 44/605 |
| 2008/0223269 | A1 * | 9/2008 | Paoluccio | 110/342 |

* cited by examiner

*Primary Examiner* — Nina Bhat
(74) *Attorney, Agent, or Firm* — Robert S. Smith

(57) ABSTRACT

A method and related apparatus for torrefaction of associated biomass which includes providing an enclosed chamber having a body and a door having an open position allowing passage into and out of the enclosed chamber and a closed position in which the door is disposed in sealing engagement with the body, providing the enclosed chamber with walls capable of sustaining both a negative pressure and a positive pressure within the enclosed chamber; moving the door to an open position; depositing a liquid heat transfer fluid within the enclosed chamber at a temperature sufficient to achieve torrefication of the biomass and a first quantity of biomass material in the enclosed chamber that is substantially totally immersed in the liquid heat transfer fluid whereby heat transfer occurs between the liquid heat transfer fluid and the biomass immersed therein; moving the door to a closed position in sealing engagement with the body; and allowing the pressure within the enclosed chamber to rise to a pressure above the vapor pressure of the heat transfer fluid as a result of the expansion of liquids and gases entrained within the biomass.

31 Claims, 8 Drawing Sheets

SEQUENCING RETORT LIQUID PHASE TORREFICATION PROCESSING APPARATUS AND METHOD

RELATED APPLICATIONS

This application is a continuation of U.S. provisional application 61/165,641 filed Apr. 1, 2009 having the same inventors.

FIELD OF THE INVENTION

The invention has particular application to methods and apparatus for conversion of the biomass into a clean burning useful fuel.

BACKGROUND OF THE INVENTION

Biomass produced through photosynthesis using the sun's energy, carbon dioxide from the ambient air and water produce an abundance of potential energy that can be a useful fuel to replace fossil fuels. Biomass that is merely left to decay will decompose and put all the collected carbon dioxide back into the environment along with methane and other green house gases. This wastes the stored suns energy. This invention can result in putting this biomass to use as a clean carbon neutral fuel and reduce fossil fuel use.

Biomass has been defined as plant material, vegetation, or agricultural waste used as a fuel or energy source. Thus, Biomass includes trees, grasses, algae, forest thinning and other plant debris, agricultural waste, lumber, wood and paper pulp, cow, pig, and horse manure and other solid waste. For convenience, the term "wood" is used herein to describe various embodiments of the invention. It will be understood that the term "wood" as used herein is merely exemplary of one possible kind of biomass and that virtually any kind of biomass may be used in practicing the present invention.

This apparatus and method of the present invention provides improvements over the previous patent applications of John A. Paoluccio, an inventor of the present invention. One such application is entitled "Method and Apparatus for Biomass Torrefaction Using Conduction Heating" and is identified as U.S. application Ser. No. 12/050,902 filed Mar. 18, 2008 and now published application US 20080223269.

Another is entitled "Method and Apparatus for Biomass Torrefaction, Manufacturing A Storable Fuel From Biomass And Producing Offsets for the Combustion Products of Fossil Fuels and a Combustible Article of Manufacture" and is identified as U.S. Pat. No. 7,942,942. This patent is incorporated by reference herein.

The U.S. application Ser. No. 11/618,868 as well as the description herein utilizes the term "conduction" with respect to heat transfer between the biomass and a liquid heat transfer fluid. This is intended to differentiate the use of a liquid in contact with the biomass instead of heat transfer between the biomass and a gas. Heat is transferred in many cases by a combination of conduction, convection and radiation and the process can be very complex at the surface boundary layer between the heat transfer surfaces. A liquid is approximately 1,000 times denser than an inert gas, thus considerably more molecules are in contact with the wood surface with a liquid than a gas.

The use of the term conduction is supported by the ASHRAE HANDBOOK FUNDAMENTALS, 2005 edition, Chapter 3 which states:

"Thermal conduction. This heat transfer mechanism transports energy between parts of a continuum by transfer of kinetic energy between particles or groups of particles at the atomic level. In gases, conduction is caused by elastic collisions of molecules; in liquids and electrically non-conducting solids, it is believed to be caused by longitudinal oscillations of the lattice structure. Thermal conductions in metals occur, like electrical conduction, through the motion of free electrons." (emphasis added)

Other authorities may describe the immersion of a biomass feedstock into a hot heat transfer fluid for direct heating contact between a hot liquid and the biomass surface differently. Such authorities may assert that the heat transfer rate is characterized by the unit surface heat transfer, or film, coefficient, h, in units of $W/m^{2 \cdot \circ} C.$ (or $BTU/hr \cdot ft^{2 \cdot \circ} F.$) and that the film coefficient for convection from a moving fluid to a solid surface is much greater for a liquid than for a gas, assuming equivalent flow. It will be understood by all that (1) there is the potential to create processing equipment of smaller size and less cost than an equivalent gas-phase system and (2) the higher film coefficient for torrefication using a liquid heat transfer fluid also offers several advantages compared to a gas-phase heat transfer media; these include shorter heating times and operating costs, lower fluid velocities and therefore more ease of control, smaller volumes and therefore more compact sizing, and relatively low pressures as compared to a gas phase process.

Although the invention has application to virtually any form of biomass, the term "wood" is used herein to describe various embodiments of the invention. It will be understood that the term "wood" as used herein is merely exemplary of one possible kind of biomass and that virtually any kind of biomass may be used in practicing the present invention. Biomass when collected typically will have a bulk density of 10 to 15 pounds per cubic foot and it is common to chip and shred it and then run it through a pellet mill to reduce handling and transportation costs. Typically this concentrates the biomass into convenient pellet form that may be ¼" diameter by 1" long with a bulk density of 50 pounds per cubic foot as explained in John A. Paoluccio's prior published U.S. patent application 20070266623. Embodiments of the present invention will often utilize wood or other biomass that is compressed into pellets prior to being processed in accordance with other aspects of this invention.

The apparatus described includes retorts. It will be understood that the term is used in the chemical industry sense where a "retort" is an airtight vessel in which substances are heated for a chemical reaction producing gaseous products to be collected in a collection vessel or for further processing. Such industrial-scale retorts are used, for example, in oil shale extraction processes that include the step of heating oil shale to produce shale oil, shale gas, and spent shale. Typically, industrial processes using such retorts use steam or hot gases for heat treatment.

SUMMARY OF THE INVENTION

It is a broad object of the invention to provide apparatus and a method that can convert the biomass into a clean burning useful fuel.

It is also an object of this invention is to provide a practical and effective processing system that can produce large quantities of torrefied biomass pellets for use as a biofuel and reclaim more condensable gases into liquids for commercial use.

Another object of the present invention is to minimize environmental issues involved in torrefaction using gas-phase systems and the emissions system controls required by such approaches.

Still another object of the present invention is to more easily facilitate the exclusion of oxygen inherent in a gas-phase torrefaction process.

Yet another object of the present invention is to provide an apparatus and method that will enable the use of the heat transfer fluids having higher vapor pressures.

A further object is to minimize handling of biomass pellets during the torrefaction process in order to minimize damage to the torrefied biomass pellets.

Another object of the present invention is to minimize production costs and minimize the environmental impact of production as well as to produce a product that will benefit the environment.

A still further object of the present invention is to provide a method of preparing biomass into a uniform substantially homogeneous feed stock prior to gasification.

It has now been found that these and other objects of the invention may be achieved in a method for torrefaction of associated biomass which includes providing an enclosed chamber having a body and a door having an open position allowing passage into and out of the enclosed chamber and a closed position in which the door is disposed in sealing engagement with the body, providing the enclosed chamber with walls capable of sustaining both a negative pressure and a positive pressure within the enclosed chamber; moving the door to an open position; depositing a liquid heat transfer fluid within the enclosed chamber at a temperature sufficient to achieve torrefaction of the biomass and a first quantity of biomass material in the enclosed chamber that is substantially totally immersed in the liquid heat transfer fluid whereby heat transfer occurs between the liquid heat transfer fluid and the biomass immersed therein; moving the door to a closed position in sealing engagement with the body; and allowing the pressure within the enclosed chamber to rise to a pressure above the vapor pressure of the heat transfer fluid as a result of the expansion of liquids and gases entrained within the biomass.

Other embodiments include a method for torrefaction of associated biomass which includes providing an enclosed chamber having a body and a door having an open position allowing passage into and out of the enclosed chamber and a closed position in which the door is disposed in sealing engagement with the body, providing the enclosed chamber with walls capable of sustaining both a negative pressure and a positive pressure within the enclosed chamber; moving the door to an open position; depositing a liquid heat transfer fluid within the enclosed chamber at a temperature sufficient to expel water and volatile gases from the biomass; depositing a first quantity of biomass material in the enclosed chamber that is substantially totally immersed in the liquid heat transfer fluid whereby heat transfer occurs between the liquid heat transfer fluid and the biomass immersed therein; moving the door to a closed position in sealing engagement with the body; and allowing the pressure within the enclosed chamber to rise to a pressure above the vapor pressure of the heat transfer fluid as a result of the expansion of liquids and gases entrained within the biomass.

In some embodiments of the invention, the method for torrefaction of associated biomass may further include the following steps after the allowing step: removing the heat transfer fluid; depositing a second quantity of liquid heat transfer fluid within the enclosed chamber with the biomass completely immersed in the liquid heat transfer fluid at a temperature sufficient to cause torrefaction of the biomass; and allowing the pressure within the enclosed chamber to rise to a pressure above the vapor pressure of the heat transfer fluid as a result of the expansion of liquids and gases entrained within the biomass whereby the heat transfer fluid remains liquid and thus heat transfer continues between the liquid heat transfer fluid and the biomass more rapidly than if the heat transfer fluid changed to a gas phase. Still other steps may thereafter occur including removing the heat transfer fluid; depositing a third quantity of liquid heat transfer fluid within the enclosed chamber with the biomass completely immersed in the liquid heat transfer fluid at a temperature sufficient to cool down the biomass after torrefaction; and directing gas into the enclosed chamber to raise pressure above the vapor pressure of the heat transfer fluid. Other embodiments may further include the step of directing gas into the enclosed chamber to exclude oxygen. The gas may have a low oxygen content and may include nitrogen.

Other embodiments of the present invention include the method for torrefaction of associated biomass which includes providing a set of multiple retorts; loading at least some of the retorts in the set with biomass; providing a plurality of reservoirs of heat transfer fluid at respective predetermined temperatures corresponding to pre-heat, heat treatment and cooling temperatures; sequentially pumping liquid heat transfer fluid from the reservoirs containing heat transfer fluid at pre-heat, heat treatment, and cooling temperatures into retorts containing biomass to achieve heat treatment of the biomass without physical movement of the biomass. The pre-heat temperature may be approximately 300° F. The heat treatment temperature may be approximately 480° F. The cooling temperature may be approximately 320° F.

Another embodiment of the present invention includes the method for torrefaction of biomass in a steady state process which includes providing a plurality of retorts including at least a first, second and third retorts; sequentially in each retort repetitively depositing biomass, placing a heat transfer fluid in the retort at a pre-heat temperature for a finite period, placing a heat transfer fluid in the retort at a heat treatment temperature for a finite period, placing a heat transfer fluid in the retort at a cooling temperature for a finite period, unloading the biomass that has been subjected to the treatment. The pre-heat temperature may be approximately 300° F. The heat treatment temperature may be approximately 480° F. The cooling temperature may be approximately 320° F. Some forms of this embodiment may have the sequential steps of depositing, placing, placing, placing and unloading in the first and second retorts sequence so that they are not synchronous and occur out of phase with respect to each other. Other forms have the sequential steps of depositing, placing, placing, placing and unloading in the second and third retorts sequenced so that they are not synchronous and do occur out of phase with respect to each other.

In some forms of the method for torrefaction of biomass as described in the heat transfer fluid at heat treatment temperature initially deposited in one of the retorts is moved to another of the retorts to achieve heat treatment. In some other forms of the method, the heat transfer fluid at pre-heat treatment temperature initially deposited in one of the retorts is moved to another of the retorts to achieve pre-heat. Similarly, in some embodiments the heat transfer fluid at cooling temperature initially deposited in one of the retorts is moved to another of the retorts to achieve cooling. In a like manner in some embodiments the heat transfer fluid at pre-heat treatment temperature initially deposited in one of the retorts is moved to another of the retorts to achieve pre-heat; the heat transfer fluid at heat treatment temperature initially deposited in one of the retorts is moved to another of the retorts to achieve heat treatment; and the heat transfer fluid at cooling temperature initially deposited in one of the retorts is moved to another of the retorts to achieve cooling.

In some embodiments the method includes using a heat transfer fluid used that is derived from one or more plants.

The method of biomass torrefication may be part of a larger process for harvesting biomass energy that includes preliminary steps of providing a pellet mill and forming the biomass into pellets. Similarly, the method of biomass torrefication may be part of a larger process for utilizing the energy from the torrefied biomass that further includes subsequent steps of grinding the torrefied biomass; burning the biomass with an atomization nozzle.

Other embodiments of the invention include the method of biomass torrefication wherein the process is part of a larger process for harvesting biomass energy that includes providing a gasifier and gasifying the torrefied biomass. Similarly, other embodiments of the biomass torrefication method may be part of a larger process for harvesting biomass energy that includes providing a syngas treatment unit and treating gas produced from torrefied biomass. Other forms of the method may be part of a larger process for harvesting biomass energy that includes providing a Fischer-Tropsch Synthesis unit and treating gas produced from torrefied biomass with the Fischer-Tropsch Synthesis unit to produce liquefied fuel.

Other forms of the present invention also include the apparatus for torrefication of associated biomass which includes a plurality of enclosed chambers, each chamber having walls capable of sustaining both a negative pressure and a positive pressure therein; each chamber having a body and a door having an open position and a closed position, the door in the closed position being in sealed relationship to the body; a plurality of reservoirs for heat transfer fluid at temperatures corresponding to predefined pre-heat, heat treatment and cooling temperatures; and a plurality of respective sets of pumps and associated fluid conduits for sequentially directing heat transfer fluid from each of the plurality of reservoirs into at least some of the plurality of enclosed chambers.

Some embodiments of the present invention may further include a plurality of heaters for controlling the temperature in respective reservoirs in the plurality of reservoirs. Other embodiments may also include a plurality of respective sets of pumps and associated fluid conduits for directing heat transfer fluid from one of the respective enclosed chambers to another enclosed chamber, whereby the energy to heat a given quantity of heat transfer fluid may be used in different process phases in more than one enclosed chamber.

Embodiments of the present invention also include apparatus for torrefication of associated biomass and for utilizing the product thereof which include a plurality of enclosed chambers, each chamber having walls capable of sustaining both a negative pressure and a positive pressure therein; each chamber having a body and a door having an open position and a closed position, the door in the close position being disposed in sealed relationship to the body.

The apparatus may also include a plurality of reservoirs for heat transfer fluid at respective temperatures corresponding to predefined pre-heat, heat treatment and cooling temperatures; a plurality of respective sets of pumps and associated fluid conduits for sequentially directing heat transfer fluid from each of the plurality of reservoirs into at least some of the plurality of enclosed chambers; grinding apparatus for reducing the torrefied biomass; and burning apparatus for burning the torrefied biomass after grinding.

BRIEF DESCRIPTION OF THE DRAWING

The invention will be better understood by reference to the accompanying drawings in which.

DESCRIPTION OF THE PREFERRED EMBODIMENTS

Figure 1:
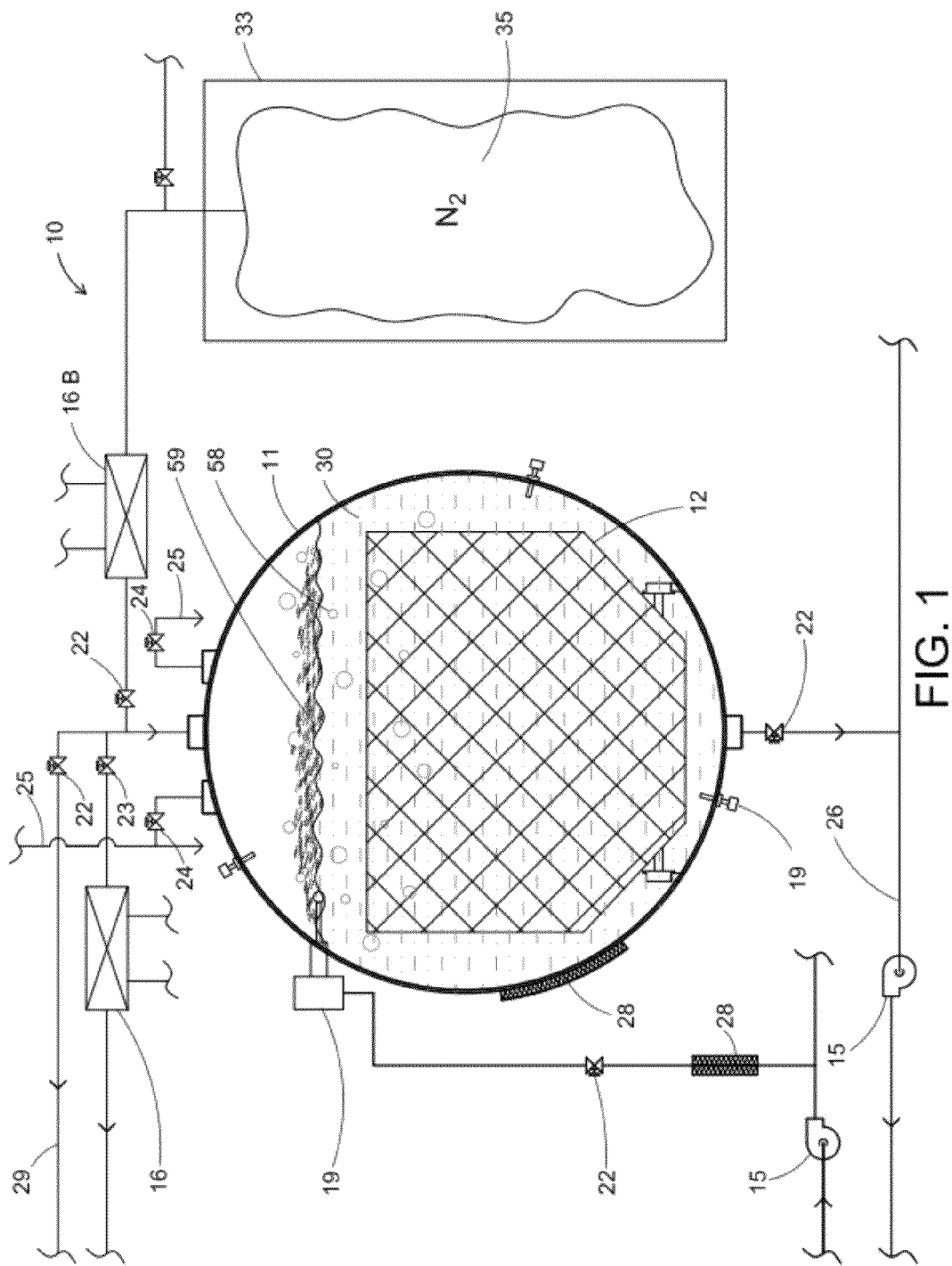
FIG. 1 is a schematic elevation view of a first embodiment having a retort filled with heat transfer fluid and a wood pellet cart on rails together with associated equipment.

The present invention allows for the use of a much broader range of liquid heat transfer fluids to be used in the heat treatment process and with a much higher vapor pressure. Currently, the abundant and low cost biomass based derived heat transfer fluid (HTF) have a higher vapor pressure than the petroleum based fluids. The biomass based HTF's have another distinct advantage and that it allows the entire processing system to claim 100% carbon neutral or renewable energy torrefied wood pellet (TWP) product. A small percentage of the HTF remains on and within the torrefied wood pellets. Some embodiments of the present invention utilizes a paraffinic HTF (typically having a heat content of over 18,000 BTU per pound) results in a very clean burning product. In addition, the torrefied wood pellets (TWP) produced have a heat content of over 10,000 BTU per pound. Thus, the fuel properties of the torrefied wood pellets (TWP) are enhanced with the HTF resulting in a very dense fuel that is environmentally beneficial.

Improving the liquid immersion process by making the process a closed pressurized system has many advantages that result in substantial improvements. The advantages include the capturing and treating of all emissions and the condensing of more of the condensable emissions as well as reducing fugitive emissions. Selecting a closed pressurized system to enable the use of higher vapor pressure HTF's requires different processing methods and apparatus. The present application describes particularly advantageous methods and apparatus suitable for higher vapor pressure HTF's. With some feed stocks, the oils driven out of the biomass mix with the HTF. This mixing results in altering or degrading the physical properties of the HTF. The alteration may include an increase in the vapor pressure. In this case, some HTF will be driven out of the retorts along with the steam and other gases. A condenser may be provided to collect most of the condensable liquids and the HTF may be reclaimed for use.

A continuous supply of HTF is required to replace whatever HTF leaves with the torrefied wood pellets (TWP) and with the vented gases. The rate of HTF use may vary widely depending on the type and properties of the wood pellets being processed. Hard dense and clean wood pellets are preferred over soft light porous pellets.

Existing methods of milling and pelletizing biomass have improved so that most biomass can be turned into dense pellets. Trees, grasses, forest thinning and debris, agricultural waste, lumber wood and paper pulp, cow, pig, and horse manure along with solid waste can all be put to use as a feedstock, that with further processing in accordance with the present invention, can produce a useful carbon neutral fuel that will reduce fossil fuel consumption.

Virtually all biomass contains large quantities of water, gases and volatile organic compounds and other chemical compositions that when burned result in incomplete combustion and generate harmful greenhouse gases. During combustion the mix of water and all the gases and carbon based compounds form many photo reactive compounds and smog related emissions. Drying all the water out of the biomass improves the combustion process but undesirable emissions still result. Clean burning is realized after the biomass undergoes a torrefaction process in accordance with the present invention.

This processing system can utilize a broad range of HTF's that may have a vapor pressure of several inches water to 5 psi or more at 480° F. In some cases a HTF with a vapor pressure of even 50 psi may be used. This broader range of vapor pressures allow for the use of more biomass based HTF's such as Jatropha oil and other vegetable, algae, nut and bean oils. Considerable biofuel research is underway in many countries and new systems are being developed that convert biomass into bio-oils. Some of these may be ideal as a heat transfer fuel and this invention will include the capability to use higher vapor pressure heat transfer fluids as they are developed in order to rely less on fossil fuel derived HTF's. Many existing oils can be used as a heat transfer fluid however, some have odors, remain wet or sticky and/or absorbed into the pellets more than others. Many of these oils can be utilized in this invention with selected biomass feed stocks.

Know prior art systems rely on "convection" heat treatment of wood utilizing a gas to transfer heat to the biomass for torrefaction. These use considerable amounts of energy and the torrefied wood produced is not uniform. In essence, the conventional approach uses a hot gas to transfer heat energy to the solid wood surface. The number of molecules from the gas in contact with the wood is very small as compared to this conduction heating apparatus and method. Utilizing a hot liquid heat transfer fluid and immersing the wood with the wood surface may put over a thousand times more hot molecules in contact with the wood surface than in a gas to biomass heat transfer process. Heat treatment methods using oxygen free gases or steam have been used for over 50 years and were first developed by the French. Gas to biomass heat treatment generally utilizes wood chips or sawdust and pelletizing is completed after the wood is torrefied. This results in a high processing cost, non uniform product, high energy use and high levels of emission pollution being generated. These are some of the reasons torrefied wood has not been used extensively to replace or co-fire with coal.

The apparatus and method in accordance with the present invention allows the use of almost any biomass to be used as a feed stock. This includes most woods, grasses, agricultural waste, forest residue, cow manure and other animal waste. Preliminary tests show that combinations of biomass may offer new solutions to energy production, solid waste management and practical combination heat and power systems. For example, animal waste such as pig manure that is partially dewatered can be mixed with dry sawdust that can be made into pellets. The mixture ordinarily will have approximately a 15% moisture content for optimum milling and pelletizing. These pellets can then be torrefied into a useful fuel by the methods and apparatus of the present invention. The greater the percentage of dewatering the greater the cost in processing sludge. The present invention allows for much lower cost dewatering. Accordingly, animal waste or even potentially human waste can be utilized as a fuel. This invention involves minimal disturbance of the wood pellets during processing and that reduces any chipping or damage to the wood pellets. Using a broader range of heat transfer fluids for liquid immersion heat treatment can significantly lower processing costs because a small percentage of the expensive heat transfer fluid (HTF) is absorbed into and coats each pellet. In certain applications it may be desirable to increase the percentage of HTF into and on the wood pellets to increase energy content.

While the methods and apparatus described in the prior application of John A. Paoluccio identified as U.S. application Ser. No. 11/618,868 filed Dec. 31, 2006 has utility in many cases, the present invention has significant differences that simplify the method and apparatus. Preferred embodiments of the present invention are characterized by:

1. Elimination of the continuous conveyor system previously used and substitute carts on tracks or a hoist instead.
2. Allow a much broader range of heat transfer fluids including biomass based HTF's that are less expensive and 100% biomass derived.
3. Utilize a closed or batch system that can be operated at various pressures to permit utilization of heat transfer fluids having a wider range of vapor pressures.
4. Allow more efficient control and capture of all the moisture, gases and volatile organic compounds (VPC) by using a closed system. Condensation of the condensable fluids that are byproducts of the process will result in a much greater capture rate.
5. Provision for extracting certain valuable oils, waxes and liquids from the biomass being processed. This includes pine oil or cedar oil for example that can be a valuable by-product of the operation. Note: Cedar wood may contain between 2 to 4% cedar oil. A 3% content corresponds to 60 pounds of cedar oil per ton of cedar wood processed. Further processing to filter, refine and condense this oil will yield approximately 5 gallons of cedar oil per ton. The value of this processed cedar oil is currently $50 per gallon. Some of the oils may mix with the heat transfer fluid (HTF) and further processing to separate the oils may be required.
6. Simplify the movement of wood pellets so that a batch of pellets need only be loaded into a given retort, processed within the retort, and then unloaded when the process is complete. Movement of successive HTF's into and out of the retort achieves the required heat treatment.

7. Allow full or partial biomass torrefication that can be very precisely controlled. The mass of the heat transfer fluid (HTF) should be much greater than the mass of wood pellets (WP) in the chambers during heat treatment to minimize the temperature drop when the HTF comes in contact with the wood pellets (WP) and quickly transfers heat energy to the wood pellets (WP).
8. Provide a substantial volume or space above the level of the heat transfer fluid (HTF) within the retort to provide ample room for the vast amount of foaming that occurs when moist wood pellets (WP) are exposed to hot HTF. The greater the temperature difference, the greater the rate of foaming that occurs. The foaming action occurs when the moisture in the wood pellets (WP) turns to steam and mixes with the HTF. This causes a tremendous number of small bubbles that act as a fine foam that rises to the surface. The small bubbles burst and the steam exits the vent while most of the HTF in the bubbles falls back into the chamber.
9. The foaming action acts like a mixer in the chambers and stirs up the heat transfer fluid (HTF) and helps draw hot HTF into the wood pellets (WP) holding basket or cage.
10. Some embodiments of the present invention may include a vacuum phase when it is desirable to increase the percentage of heat transfer fluid (HTF) within the pellets. A partial vacuum may be pulled in the retorts prior to the cooling process. Then more HTF will stay within the pellets. In other words, less HTF will drain from the pellets during the cooling phase if a vacuum is drawn within the retort.
11. The cooling phase may be accomplished in many other ways besides using a HTF. The circulation of cooled nitrogen gas, allowing the ambient air to cool the vessel and the contents of the vessel and/or exterior water coils will have merit in some specific applications. However, such approaches will take considerably longer to cool the wood pellets and thus the cycle time will increase and productivity will decrease when compared to approaches utilizing direct immersion into liquid heat transfer fluid. Using an HTF is believed to be the fastest and least expensive process to achieve the goals of the present invention. One advantage of nitrogen gas cooling is that more HTF drains off the pellets when the pellets are hotter. This reduces the use of HTF and that can reduce operating costs. Introduction of nitrogen gas into the retort reduces the oxidation of the 480° F. heat transfer fluid (HTF) and the torrefied wood pellets. Minimizing oxidation of the HTF extends the life of the HTF. Spontaneous combustion of the pellets may occur if the pellets are exposed to air with oxygen at high temperatures. That is why the torrefied wood pellets with HTF needs to be cooled prior to being exposed to air.

Figure 2:
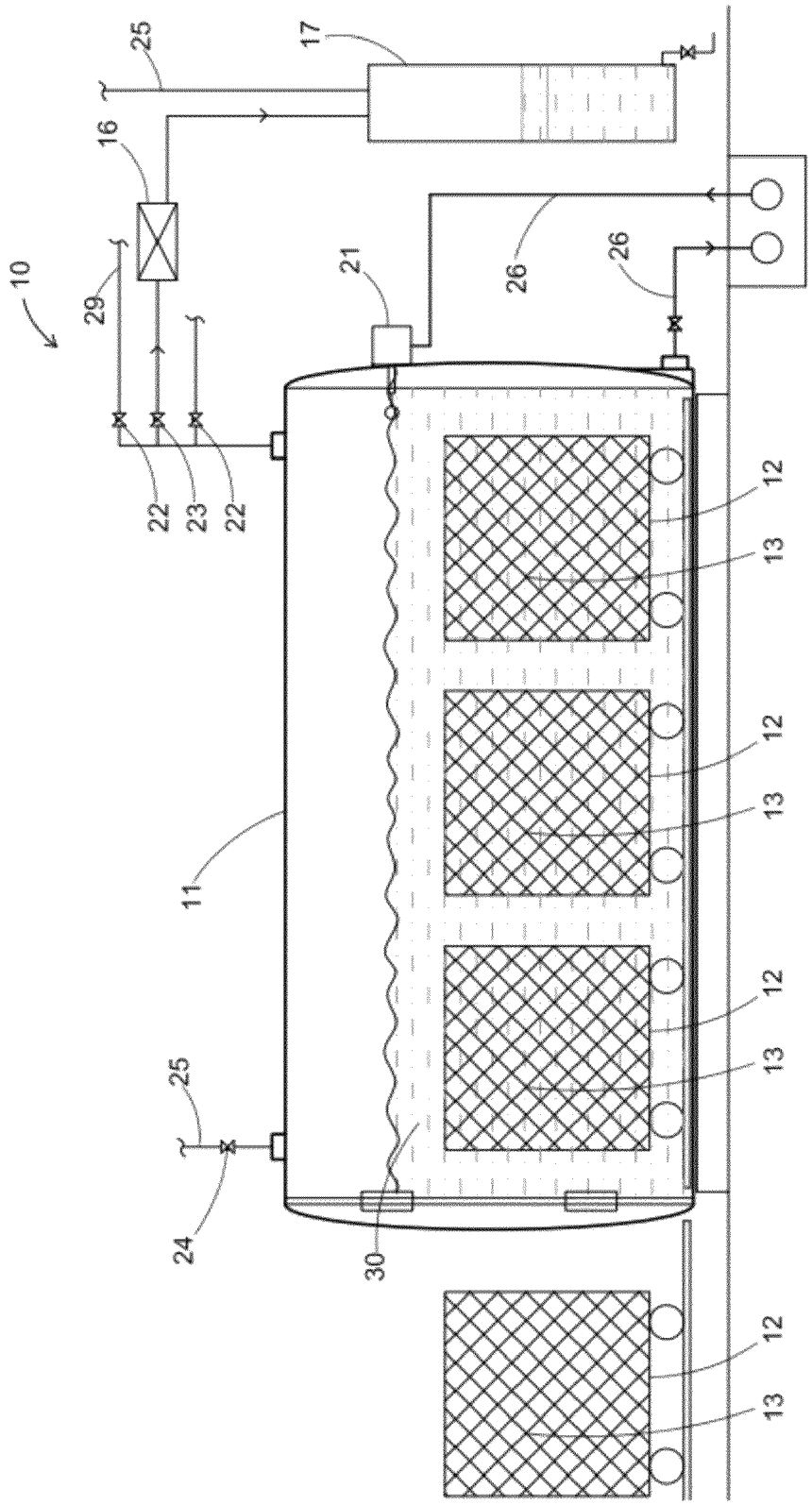
FIG. 2 is a side elevation view of a second embodiment similar to that shown in FIG. 1, having a horizontally elongated retort filled with heat transfer fluid (HTF) and containing three wood pellet carts.
Figure 3:
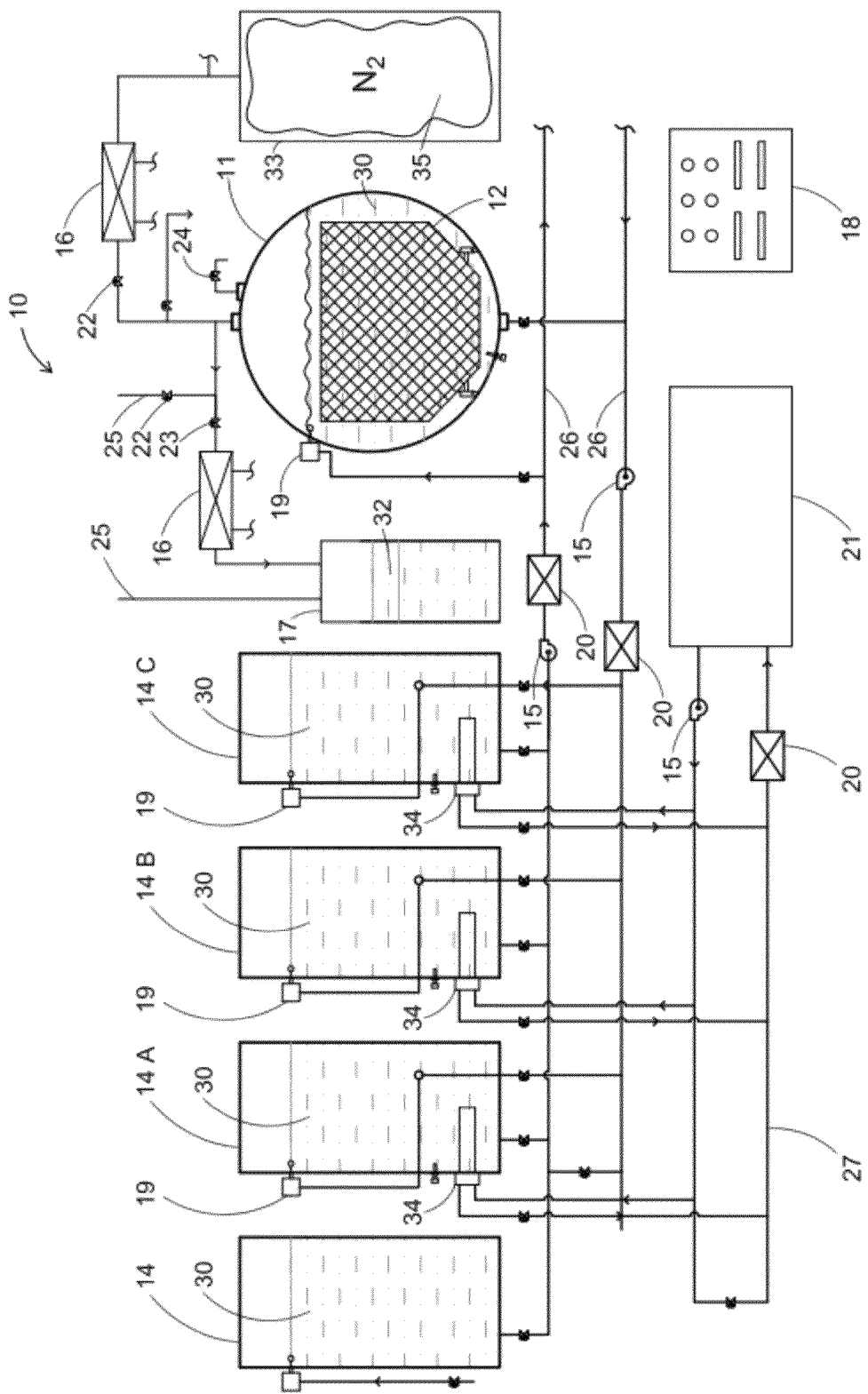
FIG. 3 is a schematic elevation view of third embodiment having a retort and heat transfer fluid (HTF) storage tanks with heat exchange coils to maintain the HTF at respective temperatures.

Referring now to FIGS. 1-3 and particularly to FIG. 3, a preferred basic forms of the apparatus and method are shown that includes a control panel 18 at which all temperature settings, temperature and pressure readings, control valve and pump operation including the different operational steps and monitoring that can be pre-set at the control panel. Alarms, lights, timers and indicators can alert process operator when to safely unload and load product. A sequence of operation and interactive processing and instrumentation flow diagram may be at the control panel to insure the proper settings for the respective operational steps including positioning all controllable valves to the proper position for automatic filling and emptying of HTF from retorts and storage tanks. Other embodiments may have phases of substantially different duration. The sequential steps are:

Phase 1—Fill Phase:
1. Open a door to a horizontal or vertical chamber retort 11. The retort 11 is empty and the interior is ordinarily at ambient air pressure in the fill phase.
2. Place wood pellets 13 or biomass into cages or carts 12 that are sized and shaped to fit into the retort 11. The cart(s) 12 may be, for example, 25% of the retort 11 volume.
3. Place the pellet filled carts 12 into the retort 11 with and secure the retort door 11A closed. Then the retort 11 is filled with ambient air and a wood pellet 13 filled cart.

Phase 2—First Preheat Phase at 250° F.: (Multiple Pre-Heating Phases may be Provided.)
1. Fill the retort 11 to a level higher than the top of the cart 12 with a liquid heat transfer fluid (HTF) 30 at a temperature sufficient to preheat the wood pellets 13 to, for example, 250° F. The HTF 30 may have a low vapor pressure with a rating of up to 4 psi at 480° F. for example.
2. Vent line 25 allows the air displaced from the retort 11 while it is being filled with 250° F. HTF 30 to exit the retort 11. The vented air exhausts to the ambient air through a valve 22 in a vent line. The pressure above the HTF 30 in the retort 11 may be close to ambient pressure as the air is expelled.
3. Once the HTF 30 reaches a fluid level that is above the wood pellet 13 filled cart 12 which may be 75% of the retort 11 volume, the air vent valve 22 closes. The entering HTF 30 may enter the retort 11 through a liquid level valve 21 with stainless steel float or sensor at a predetermined maximum level.
4. The retort 11 will then start to increase in pressure due to the heating of the wood pellets 13 and the steam 31 generated from the moisture within the wood pellets 13.
5. A pressure relief valve 23 on top of the retort 11, preset to a pressure that is above the vapor pressure rating of the HTF 30, will maintain a maximum internal pressure within the retort 11. For example, the pressure may be 5 psi. (For convenience of describing the method and apparatus, the following description may use 5 psi, however, the actual pressure will vary depending on the vapor pressure of the HTF used in the system.) As the pressure in the retort 11 increases above 5 psi the relief valve 23 opens slightly releasing the steam, air and volatile organic compounds (VOC) gases 31 to limit the pressure to 5 psi. Should the pressure continue to increase for any reason other safety relief valves will relieve any excess pressure, for example, at 10 to 20 psi above vapor pressure of HTF.
6. The expelled steam and gases 31 then pass through a vent pipeline routed to a condenser 16. The condenser 16 may be a shell and tube type that is water cooled. Part of the expelled steam and gases 31 is cooled to the point where the gases condense into water and condensable hydrocarbon liquids 32. The liquids 32 drain into a storage tank 17 and the non condensable gases are vented 25 to atmosphere, or to a flare or to a burner.
7. The preheat HTF 30 may be circulated between the retort 11 and a preheat tank 14 preset at a temperature of 250° F. This will tend to maintain the temperature within the retort 11 at 250° F. minus the heat loss to the wood pellets 13. In some cases with certain biomass pellets the preheat temperature may be lower or higher depending on the moisture content of the incoming biomass and any reclaimable oils within the biomass pellets.

8. The preheat phase may be controlled by a control panel 18 and timer and may continue for 15 minutes, for example. When the preheat time period is reached the HTF circulating pump 15 turns off. Prior experiments reveal that it is preferred to not preheat too fast with high temperature HTF 30 because the rapid conversion of water to steam can cause the wood pellet 13 or other biomass to degrade with large porous openings and break apart. That is one reason for including two preheat phases even though Torrefication can occur without any preheating.

9. A transfer pump 15 then turns on to drain the 250° F. HTF 30 out of the retort 11 and transfer it to the preheat storage tank 14. A liquid level sensor 21 at the lower level of the retort and a fluid flow switch will send a signal to the control panel 18 when the retort 11 is emptied of HTF 30 and shut off the transfer pump. 15. The transfer pump 15 may be sized to drain the retort 11 in 3 minutes.

10. During this preheat draining phase a nitrogen gas supply from a valved piping system to a nitrogen bladder storage tank 33 fills the retort 11 as the HTF 30 is being displaced. The control valve 22 on the nitrogen line is open during the draining phase and is normally closed.

11. The retort 11 with preheated wood pellets 13 surrounded by nitrogen, or some other oxygen free gas, and empty of the 250° F. HTF 30 is now ready for the next phase.

12. The transfer pump 15 is now "off". The nitrogen control valve 22 is now "open". A higher temperature preheat phase at 350° F. can now take place.

Phase 3—Second Preheat Phase at 350° F.: (This is a Near Similar Repeat of the Above.)

1. Fill the retort 11 to a level higher than the top of the cart 12 with a heat transfer fluid (HTF) 30 at a temperature to preheat the wood pellets 13 to for example 350° F. The HTF 30 may have a low vapor pressure with a rating of up to 4 psi at 480° F. for example. The HTF will be directed from the preheat tank 14A where it is maintained at the desired temperature.

2. Vent the displaced nitrogen within the retort while it is being filled with HTF 30. The vented nitrogen will be vented back into the nitrogen storage bladder 33 for reuse or to another vessel 14, 14A or 14B. The pressure above the 350 HTF 30 in the retort 11 is close to ambient pressure as the nitrogen is being transferred.

3. Once the HTF 30 reaches a fluid level that is above the pellet cart 12, which may be 75% of the retort 11 volume, the nitrogen vent control valve 22 closes. The retort will then start to increase in pressure due to the heating of the wood pellets 13 and the steam generated from the moisture and volatile organic compounds (VOC) 31 within the wood pellets 13.

4. A pressure relief valve 23 on top of the retort 11 is preset (for example to 5 psi) to a pressure that is above the vapor pressure rating of the HTF 30, will limit the maximum internal pressure within the retort 11. As the pressure in the retort 11 increases to the pressure setting of the relief valve 23, the valve opens slightly to release the steam, air and gases 31 to reduce the pressure to 5 psi.

5. The expelled steam and gases 31 then pass through a pipeline routed to a condenser 16. The condenser 16 will be a shell and tube type that is water cooled in some embodiments of the invention. Part of the expelled steam and gases 31 is cooled to the point where the gases condense into water and condensable liquids 32. The liquids 32 drain into a storage tank 17 and the non-condensable gases 25 are vented to atmosphere, or to a flare or other burner.

6. The preheat HTF 30 may be circulated between the retort 11 and a preheat tank 14 preset at a temperature of 350° F. This will tend to maintain the temperature within the retort 11 at 350° F. minus the heat loss to the wood pellets 13. In some cases with certain biomass pellets, the preheat temperature may be lower or higher depending on the moisture content of the incoming biomass and any reclaimable oils 32 within the biomass pellets.

7. The preheat phase may be controlled by the control panel 18 and a timer and may continue for 15 minutes, for example. When the preheat time period is reached the HTF circulating pump 15 turns off. It is preferred to not preheat the pellets too fast because the rapid conversion of water to steam can cause the wood pellet 13 to degrade with large porous openings and break apart. That is one reason part of this application includes at least two preheat phases.

8. A transfer pump 15 then turns on to drain the 350° F. HTF out of the retort 11 and transfer it to the 350° F. preheat storage tank 14. A liquid level sensor 21A at the lower level of the retort 11 and a fluid flow switch will send a signal to the control panel 18 when the retort 11 is empty of HTF 30 and shut off the transfer pump 15. The transfer pump 15 will be sized to drain the retort 11 in a short time such as 3 minutes. The rapid movement of the HTF facilitates rapid sequencing of the respective steps of the system.

9. During this preheat draining phase a nitrogen supply from a valved piping system to a nitrogen bladder storage tank 33 or other vessel 14 fills the retort 11 as the HTF 30 is being displaced. The control valve 22 on the nitrogen line is open during the draining phase and is normally closed.

10. The retort 11 with preheated wood pellets 13 surrounded by nitrogen, or some other oxygen free gas, and empty of the 350° F. HTF 30 is now ready for the next phase.

11. The transfer pump 15 is now "off". The nitrogen control valve 22 is now "open". A higher temperature heat treatment phase can now take place.

Phase 4—Heat Treatment Phase at 480° F.: (This is Where Torrefaction Occurs.)

1. Fill the retort 11 to a level higher than the top of the cart 12 with a heat transfer fluid (HTF) 30 at a temperature to heat treat the wood pellets 13 to for example 480° F. The HTF 30 may have a low vapor pressure with a rating of up to 4 psi at 480° F. for example. The HTF will be directed from the heat treatment tank 14C where it is maintained at the desired temperature.

2. Vent the displaced nitrogen within the retort while it is being filled with HTF 30. The vented nitrogen shall be vented back into the nitrogen storage bladder 33 or other vessel 14 for reuse. The pressure above the 480 HTF in the retort 11 is close to ambient pressure as the nitrogen is being transferred.

3. Once the HTF 30 reaches a fluid level that is above the pellet cart 12, which may be 75% of the retort 11 volume, the nitrogen vent control valve 22 closes. The retort 11 will then start to increase in pressure due to the heating of the wood pellets 13 and the gases 31 generated from the volatile organic compounds (VOC) within the wood pellets.

4. A pressure relief valve 23 on top of the retort, preset to 5 psi for example, that is above the vapor pressure rating of the HTF 30, will maintain a maximum internal pressure of 5 psi within the retort. As the pressure in the retort 11 increases above 5 psi the relief valve 23 opens slightly releasing the gases 31 to limit pressure to 5 psi.

5. The expelled gases 31 then pass through a pipeline routed to a condenser 16. The condenser 16 may be shell and tube type that is water cooled. Part of the expelled gases 31 are cooled to the point where the gases condense into condensable liquids 32. The liquids drain into a storage tank 17 and the non-condensable gases are vented to atmosphere, or to a flare or to a burner in the heater 21.

6. The heat treatment HTF 30 may be circulated between the retort 11 and a heat treatment tank 14 preset at a temperature of 480° F. This will tend to maintain the temperature within the retort 11 at 480° F. minus the heat loss to the wood pellets or torrefied wood pellets 13. In some cases with certain biomass pellets, the heat treatment temperature may be lower or higher depending on the biomass and any reclaimable oils within the biomass pellets.

7. When wood is heated in the absence of oxygen to temperatures of 180° C. to 280° C. (or 355° F. to 536° F.) it gives off moisture, carbon dioxide and large amounts of acetic acid and volatile organic compounds (VOC) 31. Complex endothermic reactions occur during this 355° F. to 536° F. heating period along with changes to the physical and chemical properties including the wood becoming more friable and hydrophobic. Torrefaction is achieved during this high temperature heating process where the moisture content is reduced to 1% or less, the mass is reduced by approximately 20 to 30%, retention of 90% of the original energy and removal of most smoke producing and tar forming agents. These temperature and pressure settings, moisture content, percentage of gases and volatile organic compounds (VOC) removed and exposure times vary with the type and density of biomass pellets being torrefied.

8. The heat treatment phase may be controlled by a control panel 18 and timer and may continue for 15 minutes, for example. When the heat treatment time period is reached the HTF circulating pump 15 turns off.

9. A transfer pump 15 then turns on to drain the 480° F. HTF 30 out of the retort and transfer it to the 480° F. heat treatment storage tank 14 or other vessel. A liquid level 21 sensor at the lower level of the retort and a fluid flow switch will send a signal to the control panel 18 when the retort 11 is empty of HTF 30 and shut off the transfer pump 15. The transfer pump 15 may be sized to drain the retort 11 in 3 minutes.

10. During this heat treatment draining phase a nitrogen supply from a valved piping system to a nitrogen bladder storage tank 33 fills the retort 11 as the HTF 30 is being displaced. The control valve 22 on the nitrogen line is open during the draining phase and is normally closed.

11. The retort 11 with heat treated torrefied wood pellets 13 surrounded by nitrogen, or some other oxygen free gas, and empty of the 480° F. HTF 30 is now ready for the next phase.

12. The transfer pump 15 is now "off". The nitrogen control valve is now "open". Note: The torrefied wood pellets 13 will spontaneously combust if exposed to air or oxygen at this 480° F. high temperature condition. The next phase is the cooling phase.

Phase 5—Cooling phase: Torrefied Wood Pellets Cooled from 480° F. to 250° F. to 350° F.:

1. Fill the retort 11 to a level higher than the top of the cart 12 with a heat transfer fluid (HTF) 30 at a temperature to cool the torrefied wood pellets 13 to for example 250° F. to 350° F. The HTF 30 may have a low vapor pressure with a rating of up to 4 psi at 480° F. for example. The HTF will be directed from the preheat tank 14A or 14B where it is maintained at the desired temperature.

2. Vent the displaced nitrogen within the retort while it is being filled with HTF 30. The vented nitrogen shall be vented back into the nitrogen storage bladder 33 for reuse. The pressure above the 250 F to 350 F HTF in the retort is close to ambient pressure as the nitrogen is being transferred.

3. Once the HTF 30 reaches a fluid level that is above the pellet cart 12, which may be 75% of the retort 11 volume, the nitrogen vent control valve shall remain open during this cooling phase because the cooling causes the gases to contract and a vacuum will otherwise occur within the retort 11. When the HTF 30 and torrefied wood pellets 13 average temperature drops to approximately 350° F. the nitrogen control valve may close. The air vent can then open allowing air to enter the cooling retort 11 without danger of oxidation or combustion.

4. The cooling HTF 30 may be circulated between the retort 11 and a 250° F. preheat tank 14A or 14B pre-set at a temperature of 250° F. This will tend to maintain the temperature within the retort 11 at 250 to 350° F. as it picks up heat energy from the cooling torrefied wood 13. The heat exchanger is "off" during the cooling phase.

5. The cooling phase may be controlled by a control panel 18 and timer and may continue for 10 minutes, for example. When the cooling time period is reached, the HTF circulating pump 15 turns off.

6. A transfer pump 15 then turns on to drain the 250 to 350° F. HTF out of the retort 11 and transfer it to the 250° F. preheat storage tank 14A or 14B. A liquid level 21 sensor at the lower level of the retort 11 and a fluid flow switch will send a signal to the control panel 18 when the retort 11 is empty of HTF 30 and shut off the transfer pump 15. The transfer pump 15 may be sized to drain the retort in 3 minutes.

7. During this cooling draining phase the air vent control valve 22 is open and the retort 11 fills with ambient air. The control valve 22 on the nitrogen line is closed during the later part of the draining phase.

8. The retort with cooled torrefied wood pellets 13 surrounded by air and drained or empty of the 250 to 350° F. HTF 30 is now ready for the next phase. The unloading & empty phase is next.

Phase 6—The Empty and Unloading Phase:

1. The retort 11 with cooled torrefied wood pellets 13 surrounded with air is now at ambient air pressure and the door 11A to the retort 11 can be safely opened. The opened retort 11 may be allowed to remain in the open condition for 10 minutes. This allows for continued draining of excess HTF 30 off the surface of the torrefied wood pellets 13 and to continue draining to a low point in the retort 11 for reuse.

2. The carts 12 with torrefied wood pellets 13 may be at 250 to 350° F. at this point and may be removed for further ambient air cooling and draining. The process is now complete for one cycle. The entire cycle can now be repeated over and over starting with the Fill Phase.

The overall time to complete the above single batch cycle from Filling to Empty phases may take approximately 90 to 120 minutes total in a representative embodiment of the present invention. In order to reduce the time for the batch cycle process, additional retorts 11 can be utilized that allow for continuous sequential operation. With four (4 or more) retorts 11 being used in one process, at least one retort 11 will always be operating in one of the phases. This makes the process system operate more like a continuous process. A retort 11 can be unloaded by removing torrefied wood pellets 13 and reloaded with wood pellets 13 approximately every 15 minutes. The HTF 30 for pre-heating, heat treatment and cooling will be transferred between different retorts 11 or chambers and or storage tanks 14 for more efficient operation.

This sequential operation is ideal for large scale operation. One of an array of retorts 11 will be in the Phase 1—Fill Phase for approximately 15 minutes. For example, if 6 retorts 11 were used and each had a capacity of 20 tons of wood pellets per retort 11, the total output may exceed 100 tons per hour. In this case horizontal retorts 11 with rail carts 12 for loading and unloading will be ideal. The carts 12 may be dumped into railroad cars for shipment to the electric power plants that require large volumes of fuel.

Figure 6:
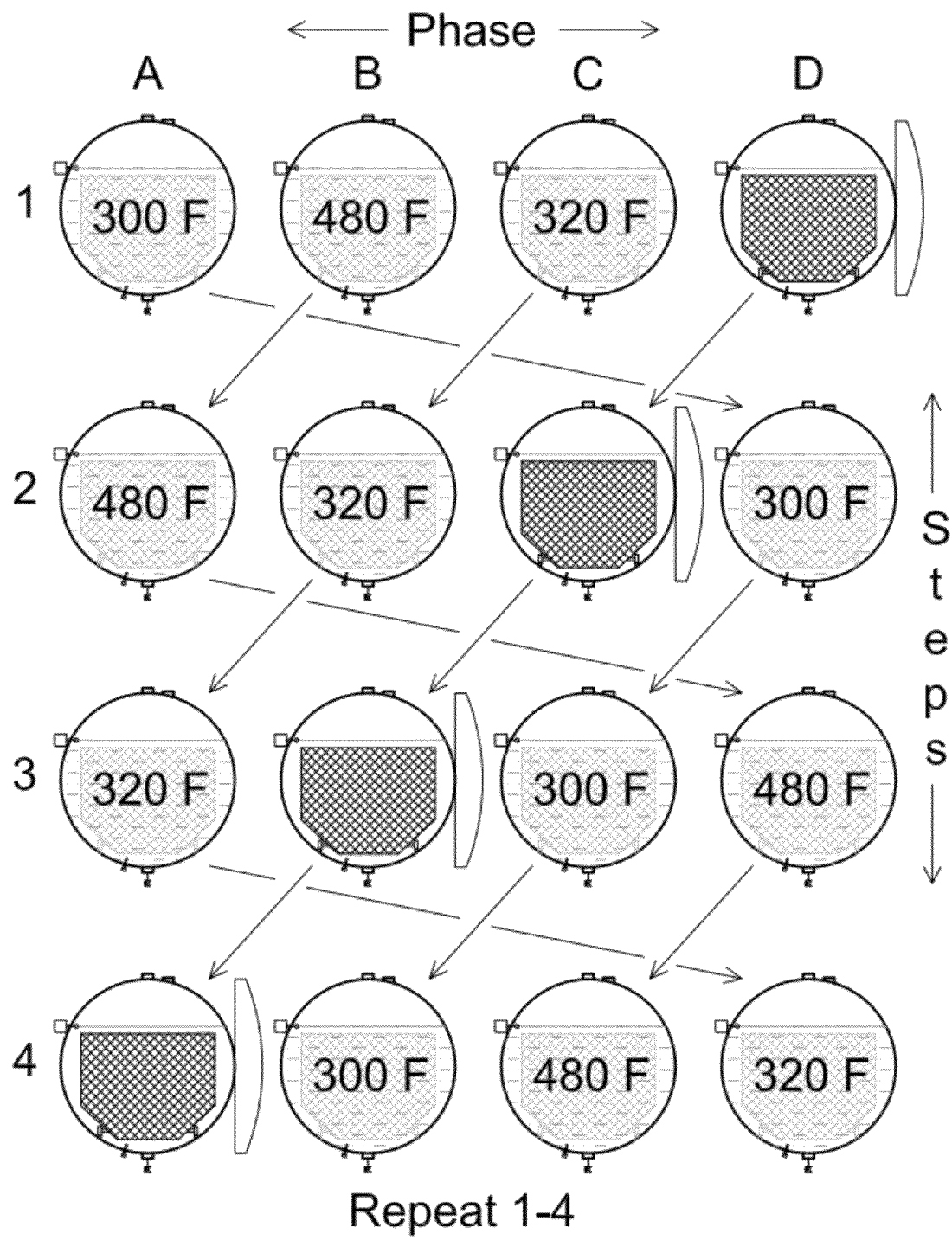
FIG. 6 is a schematic representation of the Sequencing Retort Torrefication Processing System (SRTPS) with four (4) retorts labeled A, B, C, and D in each of the four steps of the system. Each horizontal line of four retorts represents one step of four repeating steps in a set. The identical set will be repeated continuously 24 hours a day and 7 days a week for maximum efficiency.

Referring again to FIGS. 1-3 and particularly to FIG. 6, another embodiment of the Sequential Batch Torrefication Processing System (SBTPS) 10 is shown that is similar to the embodiment described above. FIG. 6 is a schematic representation of the Sequencing Retort Torrefication Processing System (SRTPS) 10 with four (4) Retorts 11 that are labeled A, B, C, and D in each of the four steps of the system. Each horizontal line of four retorts 11 represents one step of four repeating steps in a set. The identical set will be repeated continuously 24 hours a day and 7 days a week for maximum efficiency. Because substantial energy and time is required to change the temperature of the HTF and the heat transfer to the biomass does not radically impact the temperature of the HTF it is important to maintain discrete quantities of HTF at the unique temperatures required for the process. A somewhat complex HTF flow pattern between individual retorts 11 achieves substantial savings.

The retorts 11 are loaded with carts or baskets 12 that hold the wood pellets 13. The baskets may have perforated dividers that allow for HTF to flow around and between the wood pellet holding portion of the baskets. The wood pellets may occupy approximately 20% or 25% of the retort volume. Three (3) of these retort chambers will be partially filled to approximately 75% of chamber volume with pellets and Heat Transfer Fluid (HTF) at different temperatures. The upper 25% of chamber space is to allow for adequate volume for foaming 59 of the expelled moisture and gasses during the pre-heat and heat treatment phases before the steam and gases exit the vent at the top portion of the chamber. These 4 retorts 11 will each be in a different phase of operation, at one time, for a predetermined period of time (T). After the elapse of each period of time (T) a phase change will occur. The duration of each phase will be 15 minutes in a representative embodiment. This means that the phase for each retort 11 will change every 15 minutes and each phase will repeat once in every step. A pump down and pump fill time of several minutes will occur between each phase of operation. That time needs to be added to the entire cycle. The exact phase time may vary depending on temperature settings, feed stock used, moisture content of wood pellets and other factors.

By sequencing the phase of operation of respective retorts in a specific manner, a portion of the torrefied wood pellets will be removed in every step and an equal volume of wood pellets will then be loaded. The more the number of chambers, the more the system operates like a continuous flow system.

The first embodiment included two preheat phases at respectively temperatures of 250° F. and 350° F. before the heat treatment phase of 480° F. That is preferred with wood with higher moisture content. This embodiment includes one pre-heat phase utilizing the heat treatment storage vessel 14B holding HTF at 300° F. (a temperature selected to be suitable with dryer incoming feedstock). The pre-heat and cooling HTF's may be intermixed back and forth for more efficient energy use with heat gains in the cooling phase and heat loss in the preheat phase. The 480 F heat treatment storage vessel is 14C.

The four steps for steady state repetitive system operation occurs after all retorts 11 have gone through at least one start-up cycle. This may take an hour or two. In the four steps for steady state repetitive system operation HTF is transferred between retorts 11 that are to be operated at the same temperature conditions. Then the HTF is circulated to the appropriate storage vessel 14B or 14C to maintain temperature and make up heat loss.

FIG. 6 is a schematic representation of the Sequencing Retort Torrefication Processing System (SRTPS). In the illustrated embodiment there are four retorts. Each batch of biomass stays in the same retort for all processing. The process in the preferred embodiment moves HTF from one retort to another in a manner that minimizes process energy requirements. The sequential movement occurs between the four retorts (labeled A, B, C, and D) in each of the four processing phase of the respective steps of the process. Each horizontal line of four retorts represents one step of four repeating steps in a set. Thus, each horizontal line or row of the diagram represents the phase of each of the four retorts in a given step. Each vertical line or column represents the phase of each retort in each of the four steps of the set. It will be understood that the vertical columns represent the sequential phases of processing a single batch of biomass. Similarly, the horizontal lines represent one phase of the processing of four respective batches of biomass. Arrows diagrammatically illustrate the flow of HTF between specific retorts in each step to other retorts in a subsequent step. The identical set will be repeated continuously 24 hours a day and 7 days a week for maximum efficiency. FIG. 6 represents this steady state operation (after a start up procedure). Thus, in summary, all 16 retorts in FIG. 6 represent a set, each row represents a step. Each retort in each step represents a phase in the overall process. It will be seen that each column as well as each row represents the endless chain of sequential events corresponding to pre-heat, heat treatment, cooling and load/unload.

It is inherent in the process that handling of the torrefied pellets be minimized because handling will cause damage to the pellets in addition to inherently involving expense. It is also inherent in the process that is highly desirable to minimize the need to change the temperature of the heat transfer fluid. Thus, it is highly desirable to maintain a first quantity of heat transfer fluid at the pre-heat temperature and tank 14 as best seen in FIG. 3, a second quantity of heat transfer fluid 30 at heat treatment temperature and a third quantity of heat transfer fluid 30 at cooling down temperature. To minimize time and energy requirements each of the three quantities of heat transfer fluid 30 will be temperature controlled to only a specific temperature and each of the three quantities will be kept separate. Ideally, the pellets will be moved in a cart into a specific retort and the pre-heat, heat treatment and cooling steps will all occur in the same retort. Furthermore, once the process is started, it is preferable that it continue 24 hours a day, seven days a week. This is preferable because of the expense and time required to change the temperature of the heat transfer fluid 30. However, intermixing of the pre-heat and cooling HTF can occur to capture the heat loss from the TWP and transfer it to the pre-heat HTF. This can be accomplished with controls in the control panel and with additional pumps. Not all pumps, temperature controllers and control valves are shown in the drawing for clarity. For example, each retort 11 and each storage vessel 14 may have its own circulating pump 15 and piping 26 system.

At the time of initial start up it will be necessary to load a cart of wood pellets into one of a set of four retorts and start the pre-heat phase in that specific retort. In the preferred embodiment that phase will last for 15 minutes. During that 15 minute period a second retort in the set will be loaded with a cart carrying wood pellets. At the end of the first 15 minute period the heat transfer fluid 30 in the first retort will be pumped back to a holding tank and the second quantity of heat transfer fluid 30 will be pumped into the first retort to accomplish the treatment. This continues in the logical incremental steps until all of the retorts in each step are operating in one of the phases (at any given moment) described herein.

Once all of the four retorts in the set are in operation it is possible to achieve substantial efficiencies by sequentially moving the heat transfer fluid 30 in the manner illustrated in FIG. 6. The top row in FIG. 6 represents the phases of each of the four retorts once continuous stepping of the individual retorts has started. More particularly the retorts A, B, and C each have a cart of pellets disposed within them and the retort D is empty. Both the respective columns as well as the rows in FIG. 6 correspond to the endless repetitive steps described herein. Each step includes the pre-heat, heat treatment, cooling and unloading/loading phases.

It will be understood that the overall process involves a retort being filled with liquid HTF from another retort to 75% of the total volume and the upper 25% of the volume being filled with Nitrogen. This maintains the retort chamber in an oxygen free state. A circulating pump then circulates HTF between the retort and a storage vessel to maintain proper temperature. A Pressure Relief Valve (PRV) is set at 5 psi when operating. Expelled gases are routed to a condenser. Condensed liquids, mainly water, are collected and stored or treated and non condensable gases are vented to ambient air. The condensed liquid oils are separated and stored for further processing or for commercial use. The door 11A of each retort is closed except when the retort is being emptied or loaded. The loading/unloading phase occurs respectively in steps 1-4 in retorts D, C, B, and A.

In greater detail, the loading/unloading phase such as step 1, retort D starts with the opening of the door 11A as shown in the drawing. When the door 11A is opened the TWP are allowed to air cool and drain for a few to 10 minutes. The cart(s) holding TWP are removed or "unloaded". Immediately after that, wood pellet WP cart(s) are pushed into the "open" retort and the retort is "loaded". In the very short period between being "unloaded" and "loaded", the retort 11 is "empty".

The pre-heat phase shown at step 2, retort D on the next line of FIG. 6 occurs in the same retort. In the third step represented by the third row of retorts the same retort is in Heat Treatment" phase. In the fourth step represented by the fourth row of retorts the same retort is at the cooling phase.

Still referring to FIG. 6 and specifically to the second step, the retort C is in the loading and unloading phase. Thus, this retort is either empty, loaded with cart(s) filled with wood pellets 13A, or being loaded or unloaded. Unloading means removal of carts filled with torrefied wood pellets 13B. All HTF 30 has been drained from retort 11. The door may be in an open or closed position. The temperature in retort will vary depending on how long the door has been open to ambient. The pressure will be atmospheric or "O" psig and contains ambient air. Circulating pump 15 is "Off". At end of loading and unloading phase, the door 11A is closed and 300° F. HTF is pumped in from the step 1, retort D. Air is expelled out the vent 25.

The retort 11 in step 2, retort D shows a pre-heat phase. The retort is loaded with cart(s) filled with wood pellets. The door is closed. The retort is filled with 300° F. HTF from step 1, phase A. Temperature is set at 300° F. Circulating pump P is "on". At end of pre-heat phase, transfer pump transfers HTF from step 2, retort D to step 3, retort C. The transfer vent opens between step 2, retort D and bladder storage tank 33 N fills the step 2, retort D from the bladder storage tank 33.

The step 2, retort A shows a heat treatment phase. The retort contains a cart filled with wood pellets (WP) being heat treated to convert them to torrefied wood pellets (TWP). The retort is filled with 480° F. HTF from the step 1, retort B. Temperature is set at 480° F. Expelled gases are routed to a condenser. Circulating pump P is "on". At end of the phase, circulation pump is "off" and transfer pump TP pumps 480° F. HTF from step 2, retort A to step 3, retort D. The transfer vent between step 2, retort A and step 3, retort D opens and N fills the retort at step 2, retort A.

The step 2, retort B is in the cooling phase. The retort contains cart(s) filled with torrefied wood pellets (TWP). The retort is filled with 320° F. HTF from step 1, phase C. Temperature is set at 300° F. Circulating pump P is "on". At end of this phase, the circulation pump is "off". The transfer pump TP then pumps 320° F. HTF from step 2, retort B to step 3, retort A. The air vent opens and fills the retort at step 2, retort B with air. The door is opened and torrefied wood pellets (TWP) are removed.

The four steps defining one set are essentially complete and the set is repeated over and over in normal operation.

In other embodiments of the present invention only one vertical retort 11 containing HTF is used with a top door. It is then loaded with wood pellets (WP) in a basket cage that is lowered into the HTF within the retort. The top door is then closed. The retort 11 is a pressure vessel with a relief valve 24 set to any desired pressure that is above the vapor pressure of the HTF. The HTF will be heated to various temperatures until torrefaction is complete. The door can then be opened and the cage with torrefied wood pellets hoisted upward to allow for drainage of the HTF. The process can then be repeated. The primary problem with this single retort is the very long period of time required and energy used in heating and cooling all the HTF.

In another variation of the system, additional pre-heat chambers, heat treatment and cooling chambers or retorts can be added. This may then include pre-heating at 250° F., then pre-heating at 350° F., then heat treating at 420° F. and 480° F., then cooling at 350° F., then further cooling at 250° F. This may be characterized as a six chamber sequential system.

In another embodiment of the present apparatus and method, a gasification phase could be added after the 480° F. heat treatment phase. When heated to approximately 550° F. to 850° F. or higher the torrefied wood pellets release a wood gas or syngas. This gas can be used to run an engine and has application on power generation. Certain treatment is needed to insure cleaning of the gas before used as a fuel. By adding this gasification step after the heat treatment phase, very uniform and efficient gasification occurs. In yet another variation, a liquid fuel or bio diesel can be obtained from further processing after gasification with a Fisher-Tropsch Synthesis process.

This Sequential Retort Torrefication Processing System (SRTPS) is capable of processing very small or tremendously large volumes of wood pellets. If for example a system were to have a capacity of 40 tons of wood pellets (WP) per hour the sequence will occur as described below to achieve that capacity: For simplicity of description, the weight loss due to moisture and VOC removal is neglected along with any added weight from the HTF. The pumping related time for draining and filling is included in the time shown for clarity. In actual use the pumping and draining time will be a function of the flow rate, piping size and other factors and may actually extend the cycle time 5 to 10 minutes per phase. The following time cycles include all phase operations for a 4 chamber system.

T=0 to 15 minutes: M1 will be "opened" and the 10 tons of torrefied wood pellets (TWP) removed. M-1 is now empty. Then 10 tons of wood pellets (WP) will be loaded in the chamber and the door closed.

T=15 to 30 minutes: The chamber is then filled to 75% with 300° F. HTF. Then M-2 Pre-Heating occurs where the wood pellets (WP) are immersed in the 300° F. HTF for approximately 15 minutes. At the near end of cycle the 300° F. HTF is pumped to another chamber.

T=30 to 45 minutes: The chamber is then filled with 480° F. HTF. Then M-3 Heat Treatment occurs where the wood pellets (WP) are immersed in 480° F. HTF for approximately 15 minutes. At the near end of cycle the 480° F. HTF is pumped to another chamber.

T=45 to 60 minutes: The chamber is then filled with 300° F. HTF. Then M-4 Cooling phase occurs where the torrefied wood pellets (TWP) are immersed in 300° F. HTF for 15 minutes. At the near end of cycle the 300° F. HTF is pumped out. And draining of HTF from surface of pellet occurs. The full cycle is complete in one hour.

With four chambers used in sequence, one chamber will be open in the load/unload phase and the other three will have 10 tons of wood pellets (WP) or torrefied wood pellets (TWP) each. Therefore, 10 tons per 15 minutes will be removed from the system of 4 chambers for a total capacity of 40 tons per hour. With extra allowances for pumping and draining the duration of each phase could increase to about 20 minutes and that will reduce the capacity to roughly 30 tons per hour. The frequent removal of product every 15 to 20 minutes makes the operation closer to a continuous flow system than a normal batch system operation. For the purposes of description specific weights and times have been stated. It will be understood that the specific weights are merely to illustrate representative quantities not to limit all embodiments of the present invention.

In the Sequential Retort Torrefaction Processing System (SRTPS) the primary energy used is in pre-heating the wood pellets (WP), driving out the moisture and VOC's in the wood pellets (WP), heat treating the wood pellets (WP), and cooling the torrefied wood pellets (TWP). By pumping discrete quantities at various HTF temperatures sequentially, as indicated, no energy is lost in heating or cooling the HTF from, say 300° F. to 480° F. A process that does not include this sequential movement of HTF will result in a substantial waste of energy and will operate more slowly the process considerably.

Heat Balance:

Sequential Retort Torrefaction Processing System (SRTPS): Based on 1 ton per hour output. This includes simplified calculations with wood pellets at 2,000 pounds per ton, 0.80 specific heat, 10% moisture content, 10% VOC content, and, 1000 BTU/pound to turn water to steam, and other rough estimates. "Q" is in BTU.

Heat 1 ton wood pellets (WP) from 70° F. to 300° F. during PH phase.

Q (sensible heat)=1 ton×2000 #/ton×0.8 specific heat×(300° F.−70° F.)=368,000 BTUh.

Q (latent heat of 10% moisture)=2,000#×0.10×1,000 BTU/#=200,000 BTUh.

Q=2 tons HTF×2,000#/ton×0.7 Sp. Ht.×(300° F.−300° F.)=0.

Q (sensible heat)=1 ton×2,000 #/ton×0.8 specific heat×(480° F.−300° F.)=288,000 BTUh.

Q (VOC's and other gases) allow same as latent heat for moisture.=2,000#×0.10×1,000 BTU/#=200,000 BTUh.

Q (endothermic reaction and other losses) allow same as latent heat for moisture)=2,000#×0.10×1,000 BTU/#=200,000 BTUh.

Q=2 tons HTF×2,000#/ton×0.7 Sp. Ht.×(480° F.−480° F.)=0.

The heat energy in cooling of the torrefied wood pellets (TWP) with HTF is transferred between the pre-heat HTF and cooling HTF and most is not lost.

Q TOTAL Heat treatment energy=1,256,000 BTUh per ton. Allow 50% for heat losses, pump energy, heat transfer losses and other losses.

Q losses add 628,000 BTU.

The total heat treatment energy may then be 1,884,000 BTUh. Heat content of torrefied wood pellets (TWP) is approximately. 10,000 BTU per pound or 20,000,000 BTU per ton.

Relative energy use of the system is 1,884,000 BTU/20,000,000=0.0932 or approximately 10%. Therefore, the process uses 10% of the output energy and is 90% efficient. Even if this increased to 15% that is considerably less than the estimated 30% or more used in some prior art inert gas convection heat treatment systems. The Sequential Retort Torrefaction Processing System (SRTPS) uses considerably less processing energy over a single Batch system. It also uses much less Nitrogen. In addition the system also eliminates the cooling time for all the HTF. The time delay may cause a doubling in chamber size in order to have the same output capacity. This would substantially increase the cost of the system. After initial start-up, where all HTF's are at design temperatures, all input energy is utilized for wood pellet treatment and virtually no energy is lost due to the boot strap transfer and dual use of pre-heat and cooling HTF.

On larger system a small portion of the leaving torrefied wood pellets, estimated at 10%, can be used as the fuel for all the heating energy needed for the entire SRTPS along with the electric power needed. The system could operate without any outside power.

The (SRTPS) saves energy, saves time, saves nitrogen and almost all HTF heating and cooling energy during nearly continuous operation. It also captures and controls all the emissions and gases and condenses the valuable reclaimable liquids and oils driven out of the biomass feed stock used.

FIG. 1 is a schematic elevation view of a retort filled with heat transfer fluid and a wood pellet cart on rails. The expelled vapors exit the 5 psi PRESSURE RELIEF VALVE (PRV) and go to a water cooled condenser. Nitrogen is shown stored in a bladder to enter retort when drained of HTF.

FIG. 2 is a side elevation view of a horizontal Retort filled with HTF and containing three wood pellet carts. Piping shows HTF supply and HTF return at the retort.

FIG. 3 is a schematic elevation view of the Retort and HTF storage tanks with indirect heat exchange coils to maintain the HTF at various temperatures. The HTF supply pump transfers the HTF to the Retort and a HTF return pump transfers it back to the storage tank. The heating system shown in FIG. 3 is a hot oil heater that circulates primary hot oil, also a HTF that may operate at 600 F, to the heat exchangers in each storage tank. A temperature sensor and control panel maintains each storage tank at the selected temperatures. The primary hot oil is in a closed heating system and does not mix with the secondary HTF of various temperatures that comes in contact with wood pellets. This allows the primary heating system to operate with clean hot oil with minimum wear and tear. The secondary HTF in contact with wood pellets is subject to some degradation due to contact with wood pellets and the moisture, gases and oils driven out of the wood pellets along with bits of wood pulp. This secondary HTF will have filters in the pumping systems. A continuous make up of secondary HTF will be added to replace all HTF lost and used on and in the wood pellets during processing.

Figure 4:
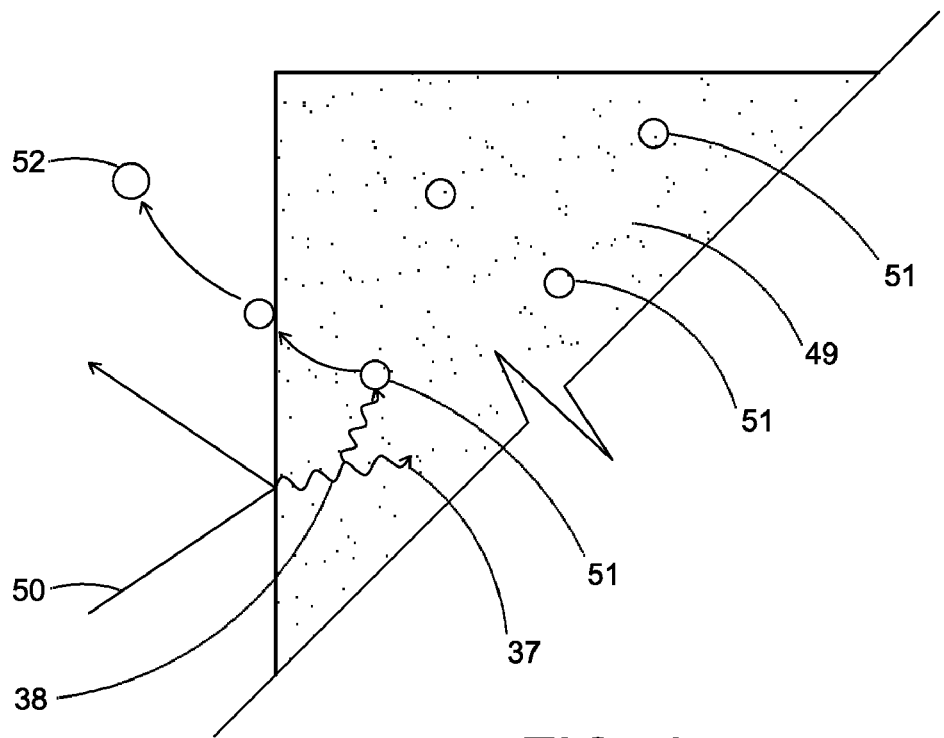
FIG. 4 is a schematic representation of wood particle after being processed in a prior art gas-phase torrefication system.
Figure 5:
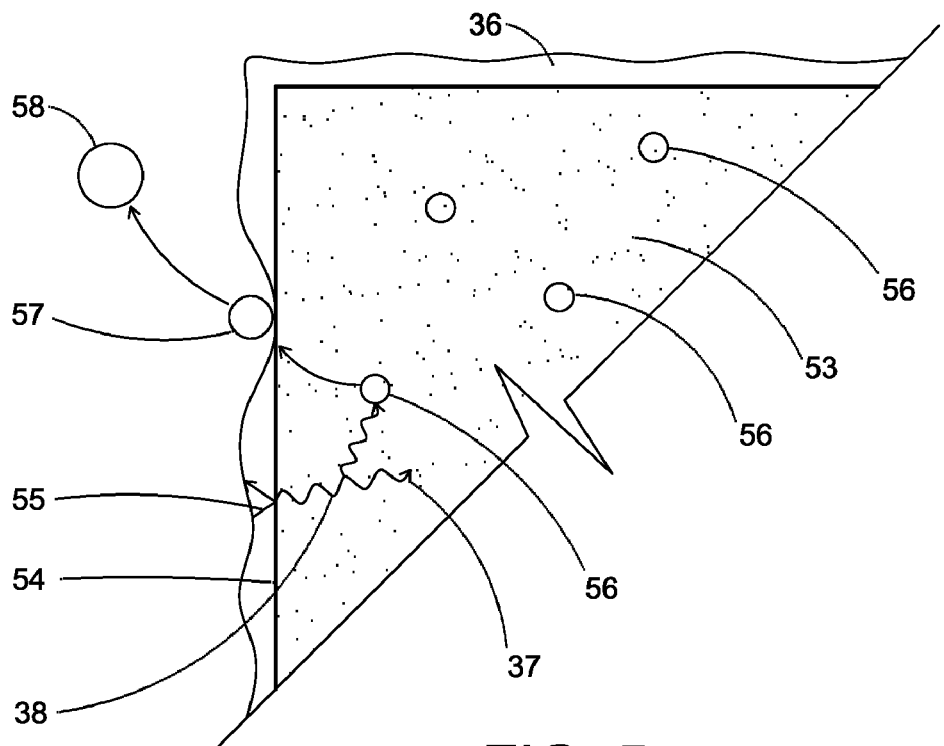
FIG. 5 is a schematic representation of part of a wood pellet after being processed in liquid phase system in which the biomass is immersed in a hot liquid heat transfer fluid in accordance with the present invention.

FIG. 4 is a schematic view of a wood particle subjected to a gas-phase torrefaction process. FIG. 5 is a schematic view of a wood particle subjected to a liquid-phase torrefaction process. FIG. 4 and FIG. 5 show comparisons between gas and liquid heat transfer. FIG. 4 will be better understood by reference to the following. The Entropy of dry air may be 55 BTU per pound. The volume of one pound of air is approximately 15 cubic feet. This equates to 4 BTU per cubic foot of volume. The heat energy is transferred by convection as the inert gas heating atoms 50 bounce against the wood 49 surface. The heat energy is transferred to the wood 49, moisture and volatile organic compounds (VOC) 51 within the wood and driven out to the surface. The moisture turns to steam and the volatile organic compounds (VOC) 52 driven out mix with the inert gas 50. The gas boundary layer adjacent to the wood surface is very thin as compared to a liquid. The number of gas molecules and atoms may be considered "N" per unit of volume. Heat energy is transferred by convection between the gas and the wood even though thermal conduction caused by elastic collisions of molecules occurs at the boundary layer. For clarity, due to the very thin boundary layer and the elastic nature of atoms bouncing against the surface, gas heating is hereinafter referred to as "Convection" heating.

FIG. 5 will be better understood by reference to the following. The Entropy of the heat transfer fluid (HTF) has a heat content of 18,000 BTU per pound or 135,000 BTU per gallon and a heat content of over 1,000,000 BTU per cubic foot of volume. The volume of one pound of HTF may be 0.016 cubic feet. The heat energy is transferred by thermal conduction at the boundary layer 54 between the HTF 55 and the wood 53 surface. The heat energy is transferred to the wood 53, moisture and VOC's 56 within the wood and driven out to the surface. The moisture turns to steam and the VOC's 57 disturb the surface boundary layer 54. The steam and VOC's 52 bubble through the HTF 54 and causing agitation and that increases the heat transfer rate. The liquid HTF 54 contains over 1,000 times as many molecules as a gas 50 and the transfer of energy to the wood is considerably faster with a liquid than a gas. The liquid boundary layer adjacent to the wood surface is considerably larger with a liquid as compared to a gas. The number of liquid molecules and atoms may be considered over 1,000 times "N" per unit of volume.

Heat energy is transferred by convection, in the liquid portion near to the boundary layer, and by thermal conduction between the liquid in the boundary layer immediately next to the wood surface that is referred to as the laminar sub layer. This is similar to the heat transfer of a fluid flowing in a pipe. For clarity, immersion heat treatment in a HTF for this application is hereinafter referred to as "Conduction" heating.

Moisture is converted to steam and driven out of the wood. Volatile organic compounds (VOC) and other gases are also driven out of the wood. The driven out gases bubble up through the HTF which increases turbulence of the HTL near the wood and enhances the heat transfer rate. Cedar, pine and other reclaimable oils are also driven out of the wood and mix with the HTF or rise to the surface as a gas. Part of the heat energy entering the wood alters the physical properties and chemical composition of the wood making it friable and hydrophobic as it undergoes an endothermic reaction and Torrefication.

Figure 7:
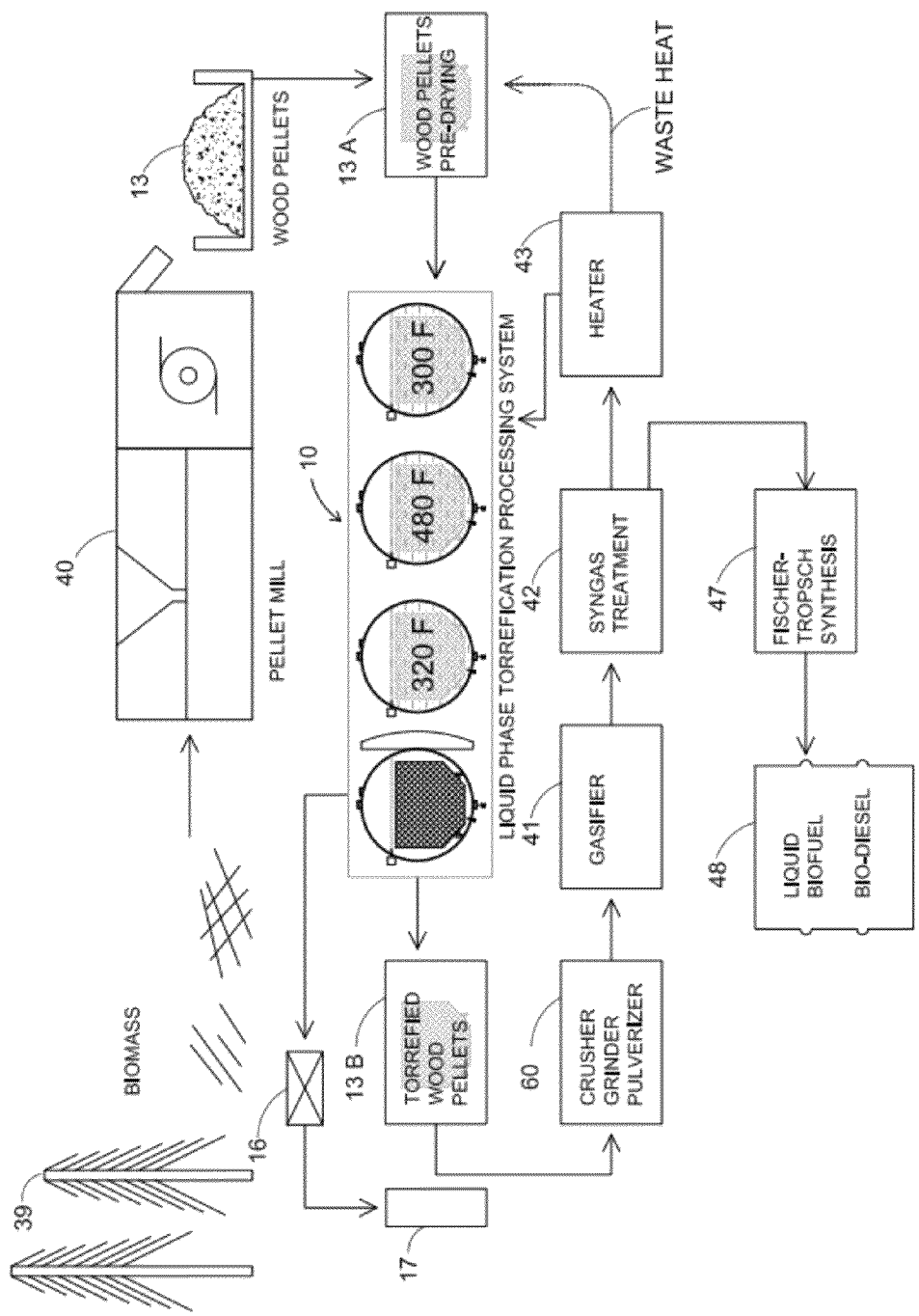
FIG. 7 is a schematic flow diagram of method and apparatus of the present invention illustrating forest thinning in a remote area and turning the biomass into a liquid biofuel in a substantially closed system with minimum emissions and no outside fuel use.

FIG. 7 is a schematic flow diagram of this invention in turning for example, forest thinning in remote areas into a liquid biofuel with a nearly closed system with minimum emissions and no outside fuel use. More particularly, FIG. 7 shows a forest where biomass is completely processed including a portable pellet mill and a biofuel processing unit as described herein, a gasifier, a syngas treatment unit and a Fischer-Tropsch Synthesis apparatus where the syngas is converted into a condensed liquid fuel such as bio-diesel. This allows for compact liquid energy from the normally wasted biomass to be easily transported by tanker truck for commercial use. In addition the cedar oil or pine oil from the cedar or pine trees may be collected for commercial use.

In the apparatus shown in FIG. 7 the main processing portion where gases are driven out is pressurized to the pressure setting of the pressure relief valve thus may be considered "closed". Thereafter, the gases pass through a condenser and then the gases exit a vent which may be deemed to be the "open" (to the atmosphere) portion of the process. The main processing is substantially "closed" and the fact that almost 100% of all the driven our moisture and gasses through a condenser makes the system more "closed' than 'open". Since gases and emissions do leave the system it is not totally "closed".

Figure 8:
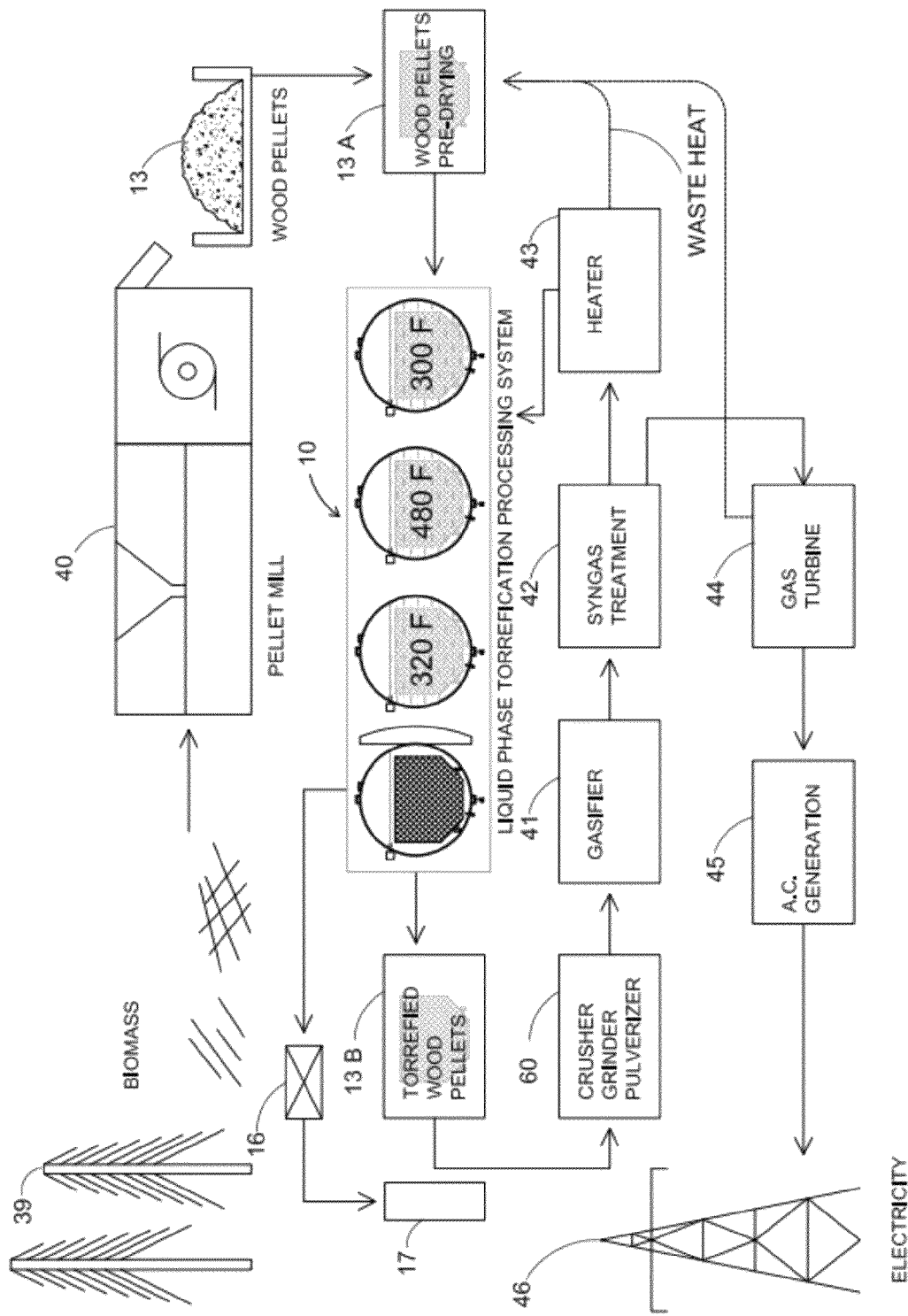
FIG. 8 is a schematic flow diagram of the present invention and turning, for example, an energy crop into useful electric energy with a nearly closed system with minimum emissions and no outside fuel use.

FIG. 8 is a schematic flow diagram of this invention in turning for example, an energy crop into useful electric energy with a nearly closed system with minimum emissions and no outside fuel use. More particularly, FIG. 8 shows a biomass source where portable equipment including pellet mill and CNFbiofuel processing unit, gasifier, syngas treatment unit and a gas turbine and A.C. Generator transform biomass into electric power. This allows for converting normally wasted biomass into electric power for commercial use.

The Sequencing Retort Torrefication Processing System (SRTPS) in accordance with the present invention can quickly and efficiently achieve torrefication of a very broad range of biomass feed stocks including all woody materials, all grasses, forest debris, agricultural waste and most animal manures, even human waste that may have other biomass materials mixed in, solid waste such as paper and cardboard, algae and Municipal Solid Waste (MSW). Such feed stocks may be utilized alone or in combination.

The Sequential Retort Torrefication Processing System (SRTPS) invention allows for combining a wet sludge of animal waste or human waste with for example dry sawdust in order to avoid the high cost of dewatering the wet sludge. This in turn can be blended to approximately an average 12 to 15% moisture content making it ideal for pelletizing. Such pellets may them be subjected to a torrefication process and transformed into TWP.

The Sequential Retort Torrefication Processing System (SRTPS) invention may be used to extract most of the harmful treated wood chemicals and liquids from old hazardous treated wood posts and other materials. The expelled hazardous substances can then be condensed into a liquid for safer disposal and the remaining torrefied wood could be disposed of more safely or converted to a useful fuel or carbon offset.

The Sequential Retort Torrefication Processing System (SRTPS) invention may be used to extract cedar oil out of cedar trees that are considered nuisance trees in parts of the USA. Cedar trees contain between 2% and 3% recoverable cedar oil. This accounts for approximately 50 pounds or 5 gallons per ton of cedar wood. Cedar oil is now being used as a very effective pesticide and is replacing other more hazardous type organic pesticides and for termite control. Cedar oil has a value of over $50 per gallon. In this case, the value could be $250 for the cedar oil from one ton of cedar wood. In this application, the pre-heat phase is where most of the cedar oil could be driven out of the cedar. The preheat HTF temperature may be 250 to 300° F. The HTF may also be biomass oil.

Many other oils and waxes from all other biomass based feed stock can also be extracted in this process. In most applications the collected water from condensed steam is heavier than the oils and settles to the bottom of the liquid collection tank. It can be drained off first, leaving the condensed oils for commercial use. Further distillation and treatment may be required to separate the various oils and the vaporized portion of the heat transfer fluid used. Heavier oils may also be extracted from some biomass and when condensed will be heavier than the water and sink to the bottom in the storage tank.

The heat transfer fluid used in the conduction process may be an oil or paraffinic fluid obtained from certain plants such as palm, Jatropha, soy, beans and nuts and algae. This substantially reduces the cost of the Torrefication process.

Figure 9:
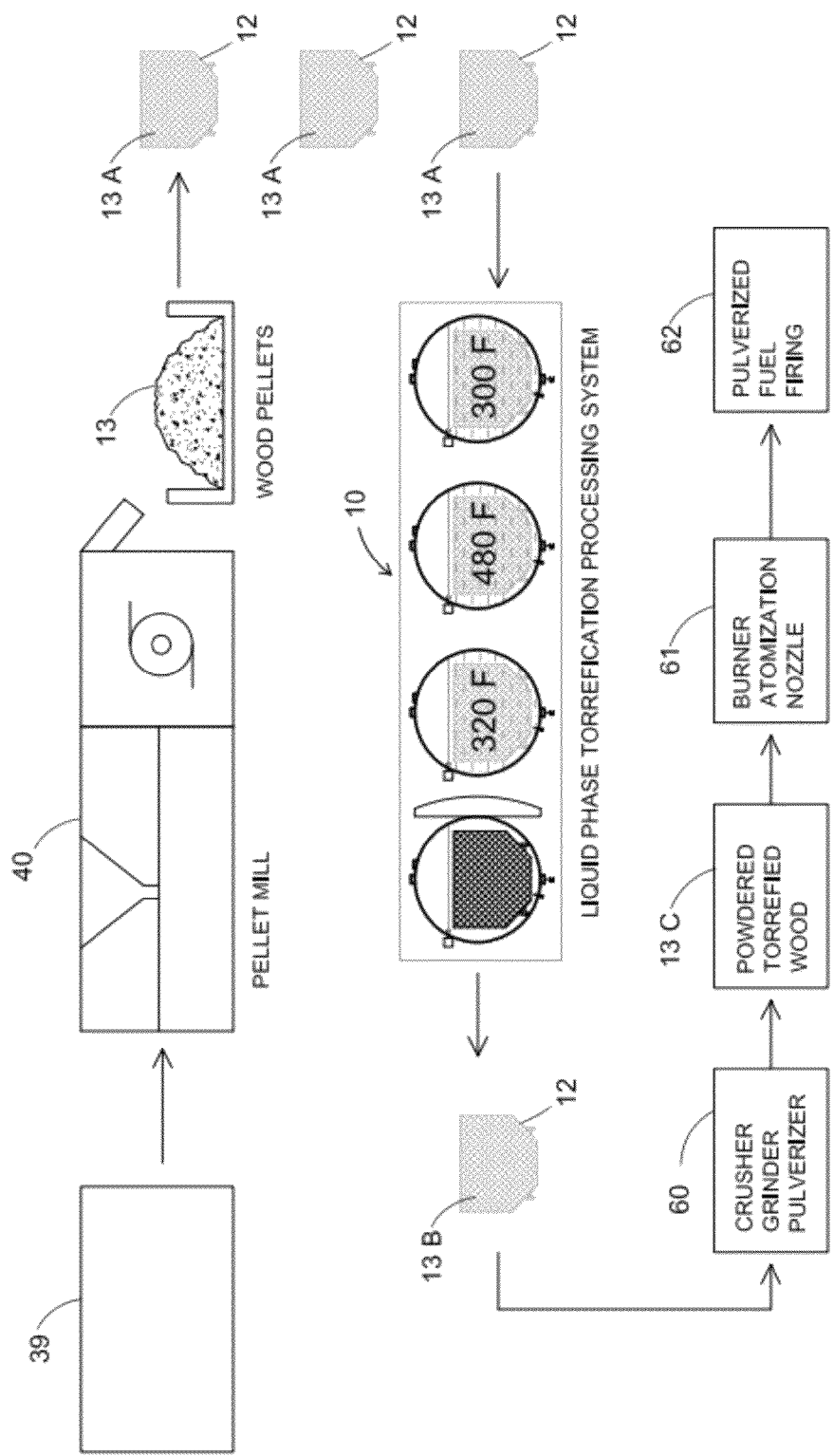
FIG. 9 is a schematic flow diagram of an aspect of the present invention for turning, for example, biomass pellets into torrefied wood pellets and then into powdered torrefied wood that is routed to a burner atomization nozzle for pulverized-fuel firing.

The Sequential Retort Torrefication Processing System (SRTPS) invention could use very low cost number 6 oil as the heat transfer fluid in some embodiments. For example, an electric power plant that uses number 6 oil as a fuel that is injected though atomization nozzles may alternatively use finely ground or crushed torrefied wood that used number 6 oil as the HTF. Thus, the user of the apparatus and/or method in accordance with the present invention may have a suitable heat transfer fluid readily available. More specifically, oil can be injected into a burner through nozzles. Similarly, powdered TWP made with oil may be utilized with atomization nozzles. Samples of TWP have been crushed into a fine powder that appears to be very well suited for existing atomization nozzles. Coal has been ground into a fine power in order for it to have more complete combustion. In some embodiments of the present invention, coal and TWP are ground together and supplied to the nozzles such as in electric power generation plants. FIG. 9. Illustrates a crusher/grinder/pulverizer 60, powdered TWP 13C, burner atomization nozzle 61 and pulverized-fuel firing 62.

The SRTPS invention can produce different qualities of torrefied wood. Torrefied wood is friable like coal, the torrefied wood (TW) can be crushed or ground to a fine power. This makes it ideal for use with atomization nozzles for boilers. The HTF boosts the heat content properties. Apparatus to perform the crushing or grinding to a fine power is shown as element 60 in FIG. 7.

The Sequential Retort Torrefication Processing System (SRTPS) invention can be used with changing the way municipal sanitary waste disposal systems operate. By separating and only partially dewatering the human waste solids to 20 to 30% moisture content and mixing that with, say twice as much, dry sawdust or more, the moisture content of the mixture can be blended to the ideal consistency for pelletizing. Not only sawdust but grasses, leaves, waste wood, agricultural waste, forest debris, algae, and many other types of biomass may be used.

Algae is currently grown and processed for producing a bio-oil. A pulp is left after the oil is extracted. This pulp is plant matter. Thus, it is a hydrocarbon and contains carbon and energy. A companion water treatment pond in the present system may use the waste pulp portion of leftover pulp from the processed algae after oil extraction, could be collected, dewatered, pelletized and either be torrefied alone or with the solid human waste. This will significantly reduce the cost of waste disposal and change the way other forms of solid waste are disposed.

The Sequential Retort Torrefication Processing System (SRTPS) invention is ideal for producing torrefied wood to different degrees of quality. By using higher temperatures, for example, 550° F. HTF in the heat treatment chamber, a higher concentration of carbon will occur because more of the volatile organic compounds (VOC) will be removed.

In a variation of the Sequential Retort Torrefication Processing System (SRTPS) invention, a very high temperature chamber(s) could be added. In lieu of cooling the torrefied wood pellets (TWP) after they complete the 480° F. heat treatment section, the torrefied wood pellets (TWP) enter a series of much higher temperature and higher pressure chambers, that may reach 800° F. or higher. The torrefied wood pellets (TWP) will undergo high temperature pyrolysis and be essentially gasified. The gas produced will be considered a wood gas or syngas. This gas could be used in heating boilers and electric energy producing power plants and will be ideal for combination heat and power (CHP) systems. CHP systems are ideal for providing all the heating needs and electric power needs for a university campus, factory, industrial plant or a city.

A major advantage of the gasification Sequential Retort Torrefication Processing System (SRTPS) invention variation is the use of a small portion of the leaving torrefied wood pellet energy or gas produced to provide all the heating energy needed for the entire SRTPS along with the electric power needed. The system could operate without the need for any outside power once it is brought up to operating temperature. That makes it ideal for use in small foreign countries that lack electric power sources.

Another variation of the gasification Sequential Retort Torrefication Processing System (SRTPS) invention variation is the use of a portable system that could be located where major biomass reserves are, such as forest debris that is also remote from transportation corridors. For example, as illustrated in FIG. 7 there is shown a forest where biomass is completely processed including a portable pellet mill and a processing unit, gasifier, syngas treatment unit and a Fischer-Tropsch Synthesis process where the syngas is converted into a condensed liquid fuel such as bio-diesel. Thus, by adding an additional catalyst device equipment, the gas can be turned into a liquid such as bio-diesel. This will allow for clearing out all the dead and diseased trees along with tree thinning and forest residue. Then mill and pelletize them into wood pellets, process the wood pellets (WP) into torrefied wood pellets (TWP); then gasify the torrefied wood pellets (TWP); then turn that into bio-diesel; then load the bio-diesel into tanker trucks for the most practical method of delivering concentrated useful carbon neutral energy to a point of use.

The ultimate improvement is the use of the pine oil, cedar oil, algae oil, Jatropha oil or any other suitable heat transfer oil driven out of the biomass feedstock and then using it as the Heat Transfer Fluid. This will make the entire process self sustaining without the need for any outside fuel or heat transfer fluid except for startup until enough oil and torrefied wood was collected. The pressure relief valves will need to be set to a relief pressure that is above the vapor pressure of the oil used. This will dramatically reduce the processing and operating costs.

The term torrefied wood pellet has been used to identify a high quality finished product produced by the apparatus and method of the present invention. This term is meant to include all finished product including feed stock that is only partially torrefied and feed stock that is heated beyond Torrefication and where gasification occurs. For example, a high temperature phase at over 600° F. may be used after the 480° F. heat treatment phase. By first processing to the 480° F. heat treatment phase all the moisture and volatile organic compounds (VOC) that cause tars to form are removed prior to gasification. At the higher 600° F. plus temperatures higher quality syngas is produced without the tar buildup problems caused by non-torrefied wood pellets.

Dairy manure, horse manure and pig manure can be easily turned into pellets with conventional technology. The prior art of collecting methane from these waste materials includes digesters that are expensive and cumbersome. It is considerably more economic to dewater and turn these waste products into waste pellets even if some dry sawdust is mixed with the waste material. Even the waste pulp from digesters can be collected and used as feedstock. Then using this Sequential Retort Torrefication Processing System (SRTPS) invention to turn them into torrefied waste pellets for a useful fuel use can result in many benefits. These waste materials currently create many environmental problems in our ground water and air. This processing system can instead, turn these waste and other waste materials into a valuable feed stock. The large expensive lagoons and ponds for methane capture could be replaced. This saves real estate and keeps methane gas out of our environment and helps replace fossil fuel with another plentiful waste resource.

The product produced by the apparatus and method of the present invention achieves the objects thereof. A further benefit is also achieved by the addition of a paraffinic HTF fluid to the biomass pellets. In addition to increasing the energy content of the pellets more hydrophobic because the paraffinic HTF fluid provides a wax like coating on the pellets thereby repelling water. Testing has established that TWP in water for months without material signs of degradation.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

The description herein has used the term "pump(s)" for describing apparatus to transfer HTF. Those skilled in the art will recognize that pumps are not limited to conventional pumps such as rotary-type, (e.g., the lobe, external gear, internal gear, screw, shuttle block, flexible vane or sliding vane, and helical twisted roots) or reciprocating-type, (e.g., piston or diaphragm pumps. More specifically the term "pump" as used herein includes creating a greater pressure above a fluid in a first vessel in fluid communication with a second vessel having a vent relief. Typically the first vessel will have the lower part thereof in fluid communication with the second vessel. Thus the liquid will be transferred initially. Passage of still more gas into the first vessel will also transfers the gas above the HTF from the first vessel to the second vessel. Therefore, even though pumps 15 are shown to transfer HTF from storage tanks 14 to retorts 11, it should be understood that the transfer of HTF 30 may be also accomplished with the use of nitrogen gas or other transfer means. By using a nitrogen gas tank, with pressure regulators, piping and control valves, an approximate equal volume of nitrogen gas at a low pressure can be directed in the top of a storage vessel, above the HTF level. A fluid outlet at the bottom of the storage vessel 14 would then transfer the HTF through piping 26 to the liquid level inlet valve 19 where HTF would enter the retort 11 and fill the retort to the appropriate level. Then, when it is desired to remove the HTF from the retort 11, an approximate equal volume of nitrogen gas at a low pressure could be directed in the top of the retort 11 above the HTF level. A fluid outlet at the bottom of the retort 11 would then transfer the HTF 30 through piping 26 to the liquid level inlet valve 19 at the storage vessel 14 where HTF would enter and fill the storage vessel 14 to the appropriate level. This nitrogen gas method of transferring HTF between vessels has certain advantages over pumps and includes less moving parts, less costly controls and provides oxygen free nitrogen gas above the surface of the HTF. This reduces oxidation of the HTF 30 and minimizes the risk of accidental combustion.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

The elements of method claim included herein follow the conventional practice that when temporal ordering is intended, the claims will make this express. For example, the method claims may describe step two as occurring after step one, or "comprising the following steps in the order named. In the case of steps are simultaneously performed, but one modifies another, the modified step precedes the modifying step. If the ordering is unstated, the claim covers the steps in any order, including simultaneous steps (Altiris, Inc. v. Symantec Corp. (2003)) The preceding sentence must be particularly understood in the context of steps like placing biomass into a container and placing a heat transfer fluid into the container. The claim may recite two separate steps, however, the order in which they occur is not material. Similarly, the step of closing the door on a container may occur before or after a heat transfer fluid is added to the container. Thus, the order in which they care is also not material.

Legend—Reference Numerals
11. Retort or Reactor vessel with metal seal at cover and pressure relief valve.
11A Door to Retort
12. Metal basket or carts with roller wheels and tracks for holding wood pellets.
13. Wood or Torrefied wood pellets.
13A. Wood pellets or wood pellets in metal cage or baskets.
13B. Torrefied wood pellets or Torrefied wood pellets in metal cage or baskets
13C. Powdered torrefied wood.

14. 14A, 14B, 14C Storage vessels with heater for heat transfer fluid (HTF).
15. Pump for circulation or transferring HTF.
16. Condenser—water cooled for condensing steam and condensable gases.
16B. Water cooled heat exchanger for cooling nitrogen gas.
17. Condensed liquid storage container.
18. Control panel with temperature controls, pressure gauges, timers, settings for phases of operation, sequence of operation and flow chart, valve controls, energy meters and monitoring equipment, instrumentation and other control items.
19. Liquid level valve—typical.
20. Filter system
21. Heater system—primary hot oil heater or boiler with closed system HTF at 600° F.
22. Control valve—typical.
23. Pressure relief valve.
24. Emergency pressure/vacuum relief valve. Route to approved location.
25. Vent line. Route to approved location.
26. Piping, fittings, (up to 480° F.) flexible connectors, pipe insulation and trim.
27. Primary piping system (600° F.) from main heater system.
28. Insulation with protective covering at all hot surfaces.
29. Air vent piping.
30. Heat transfer fluid.
31. Steam, moisture, gases, oils & waxes within wood pellets & driven out of wood.
32. Condensed liquids including water and hydrocarbons.
33. Nitrogen storage bladder system or other inert gas.
34 Heat exchanger for storage vessels heated with primary 600° F. HTF from heater 21.
(Note: Heat exchangers may be also placed in retorts.)
35 Nitrogen gas or low oxygen content gas.
36. Boundary layer and laminar sub layer of HTF next to wood.
37. Endothermic reaction.
38. Heat energy entering wood from HTF or gas.
39. Biomass, wood, trees, grass, forest thinning, agricultural waste, animal waste, municipal solid waste MSW, energy crops, and algae pulp.
40. Pellet mill facility and related equipment.
41. Gasifier equipment and system.
42. Syngas equipment and system.
43. Heating system for primary 600° F. HTF in closed system for heating vessels with 250° F. to 480° F. HTF and retorts.
44. Gas turbine.
45. AC Generator.
46. Electric power grid.
47. Fischer-Tropsch Synthesis equipment.
48 Oil tank for transport of biofuel.
49. Wood particle in a prior art inert gas heat treatment system. (Prior art. FIG. 4).
50. Inert gas, or low oxygen gas, transferring heat energy to wood particle. (Prior art).
51. Moisture, gas, and volatile organic compounds (VOC) within wood particle being heated. (Prior art).
52. Steam and volatile organic compounds (VOC) driven out of wood. (Prior art).
53. Wood pellet (partial) in hot immersion heat transfer fluid. (FIG. 5)
54. HTF at boundary layer immediately next to wood surface.
55. HTF at boundary layer transferring heat energy by thermal conduction to wood.
56. Moisture, gas, and volatile organic compounds (VOC) within wood particle being heated.
57. Steam and volatile organic compounds (VOC) driven out of wood causing turbulence at boundary layer.
58. Steam and volatile organic compounds (VOC) rising through and agitating the HTF increasing heat transfer.
59. Foam mixture on top of HTF with steam, gases and volatile organic compounds (VOC) mixed with HTF. Ample space allowed for foam to settle down before steam and gases escape out vent. This is more pronounced with wood pellets with high percentage of moisture and higher pre-heat temperatures.
60. Crusher/grinder/pulverizer—converts TWP into powdered torrefied wood.
61. Burner atomization nozzles using powdered torrefied wood. May co-fire with coal.
62. Pulverized-fuel firing. May use powdered torrefied wood with powdered coal.

Legend—Acronyms
HTF—Heat Transfer Fluid
F—Fahrenheit temperature (Values given are examples and may vary)
WP—Wood Pellets (any biomass that has been densified and pressed into pellets ¼" dia.×1" long.
TWP—Torrefied Wood Pellets (This may also be any biomass composed pellet such as wood, grass, algae, animal waste and some MSW.)
C—Chamber. This may be referred to as a retort. It has a sealable door and can operate under pressure.
M—phase of operation, For example PH, HT or CM.
PH—Pre-heat (The HTF may be at 300° F.)
HT—Heat Treatment (The HTF may be at 480° F.)
CM—Cooling phase (The HTF may be at 300° F.)
PSI or psi—Pounds per square inch pressure—gauge. Ambient atmospheric pressure is "0" psi or psig.
N—Nitrogen gas or other oxygen free gas
V—Vent or vented
NSB—Bladder Receiver—variable volume bladders for holding Nitrogen gas with make-up N supply.*
CF—Coalescing Filter* (see John A. Paoluccio U.S. Pat. No. 5,902,362) This is used to capture more hydrocarbon oils from condensed emission gases.
CV—Control Valve.
PRV—Pressure Relief Valve (This may be set to open at 5 psi or 10 psi or whatever pressure it is set at.)
VRV—Relief Valve (This may be set to open when the pressure is negative or for example −0.2 psi)
PVRV—Pressure Vacuum Relief Valve (Example—may be set to relieve pressure at +10 psi and −0.5 psi)
SRTPS—Sequential Retort Torrefication Processing System

What is claimed is:
1. A method for torrefaction of associated biomass which comprises:
providing an enclosed chamber having a body and a door having an open position allowing passage into and out of the enclosed chamber and a closed position in which the door is disposed in sealing engagement with the body,
providing the enclosed chamber with walls capable of sustaining both a negative pressure and a positive pressure within the enclosed chamber;
moving the door to an open position;
depositing a liquid heat transfer fluid within the enclosed chamber at a temperature sufficient to expel water and volatile gases from the biomass;
depositing a first quantity of biomass material in the enclosed chamber that is substantially totally immersed in the liquid heat transfer fluid whereby heat transfer occurs between the liquid heat transfer fluid and the biomass immersed therein;

moving the door to a closed position in sealing engagement with the body; and allowing the pressure within the enclosed chamber to rise to a pressure above the vapor pressure of the heat transfer fluid as a result of the expansion of liquids and gases entrained within the biomass.

2. The method for torrefaction of associated biomass as described in claim 1 further including the following steps after the allowing step:

removing the heat transfer fluid;

depositing a second quantity of liquid heat transfer fluid within the enclosed chamber with the biomass completely immersed in the liquid heat transfer fluid at a temperature sufficient to cause torrefaction of the biomass; and allowing the pressure within the enclosed chamber to rise to a pressure above the vapor pressure of the heat transfer fluid as a result of the expansion of liquids and gases entrained within the biomass whereby the heat transfer fluid remains liquid and thus heat transfer continues between the liquid heat transfer fluid and the biomass more rapidly than if the heat transfer fluid changed to a gas phase.

3. The method for torrefaction of associated biomass as described in claim 2 further including the following steps after all steps recited in claim 2:

removing the heat transfer fluid from the enclosed container;

depositing a further quantity of liquid heat transfer fluid within the enclosed chamber with the biomass completely immersed in the liquid heat transfer fluid, the further quantity of liquid heat transfer fluid being at a temperature of at least 800° F.

4. The method for torrefaction of associated biomass as described in claim 2 further including the following steps;

providing a condenser;

directing volatile gases driven out of the biomass into the condenser;

condensing oils having commercial value from the volatile gases.

5. The method for torrefaction of associated biomass as described in claim 4 wherein the oil is cedar oil.

6. The method for torrefaction of associated biomass as described in claim 2 further including the following steps after all step of claim 2:

removing the heat transfer fluid;

depositing a third quantity of liquid heat transfer fluid within the enclosed chamber with the biomass completely immersed in the liquid heat transfer fluid at a temperature sufficient to cool down the biomass after torrefaction; and directing gas into the enclosed chamber to raise pressure above the vapor pressure of the heat transfer fluid.

7. The method as described in claim 6 wherein the step of directing gas into the enclosed chamber excludes oxygen.

8. The method as described in claim 6 wherein the step of depositing a third quantity of liquid heat transfer fluid is preceded by a step of pulling a vacuum in the enclosed chamber to increase the percentage of heat transfer fluid (HTF) within the biomass.

9. The method as described in claim 7 wherein the step of directing gas into the enclosed chamber excludes oxygen by directing a gas having a low oxygen content into the enclosed chamber.

10. A method as described in claim 9 wherein the gas being directed into the enclosed chamber includes nitrogen.

11. A method for torrefaction of associated biomass which comprises:

providing a set of multiple retorts;

loading at least some of the retorts in the set with biomass;

providing a plurality of reservoirs of heat transfer fluid at respective predetermined temperatures corresponding to pre-heat, heat treatment and cooling temperatures;

sequentially pumping liquid heat transfer fluid from the reservoirs containing heat transfer fluid at pre-heat, heat treatment, and cooling temperatures into retorts containing biomass to achieve heat treatment of the biomass without physical movement of the biomass.

12. A method for torrefaction of associated biomass as described in claim 11 wherein:

the pre-heat temperature is approximately 300° F.

13. A method for torrefaction of associated biomass as described in claim 11 wherein:

the heat treatment temperature is approximately 480° F.

14. A method for torrefaction of associated biomass as described in claim 11 wherein:

the cooling temperature is approximately 320° F.

15. A method for torrefaction of biomass in a steady state process which comprises:

providing a plurality of retorts including at least a first, second and third retorts;

sequentially in each retort repetitively depositing biomass, placing a heat transfer fluid in the retort at a pre-heat temperature for a finite period, placing a heat transfer fluid in the retort at a heat treatment temperature for a finite period, placing a heat transfer fluid in the retort at a cooling temperature for a finite period, unloading the biomass that has been subjected to the treatment.

16. A method for torrefaction of associated biomass as described in claim 15 wherein:

the pre-heat temperature is approximately 300° F.

17. A method for torrefaction of associated biomass as described in claim 15 wherein:

the heat treatment temperature is approximately 480° F.

18. A method for torrefaction of associated biomass as described in claim 15 wherein:

the cooling temperature is approximately 320° F.

19. A method for torrefaction of biomass in a steady state process as described in claim 15 wherein:

the sequential steps of depositing, placing, placing, placing and unloading in the first and second retorts are not synchronous and occur out of phase with respect to each other.

20. A method for torrefaction of biomass in a steady state process as described in claim 19 wherein:

the sequential steps of depositing, placing, placing, placing and unloading in the second and third retorts are not synchronous and occur out of phase with respect to each other.

21. A method for torrefaction of biomass as described in claim 15 wherein:

heat transfer fluid at heat treatment temperature initially deposited in one of the retorts is moved to another of the retorts to achieve heat treatment.

22. A method for torrefaction of biomass as described in claim 15 wherein:

heat transfer fluid at pre-heat treatment temperature initially deposited in one of the retorts is moved to another of the retorts to achieve pre-heat.

23. A method for torrefaction of biomass as described in claim 15 wherein:

heat transfer fluid at cooling temperature initially deposited in one of the retorts is moved to another of the retorts to achieve cooling.

24. A method for torrefaction of biomass as described in claim 15 wherein:
   heat transfer fluid at pre-heat treatment temperature initially deposited in one of the retorts is moved to another of the retorts to achieve pre-heat;
   heat transfer fluid at heat treatment temperature initially deposited in one of the retorts is moved to another of the retorts to achieve heat treatment; and
   heat transfer fluid at cooling temperature initially deposited in one of the retorts is moved to another of the retorts to achieve cooling.

25. A method for torrefaction of associated biomass which comprises:
   providing an enclosed chamber having a body and a door having an open position allowing passage into and out of the enclosed chamber and a closed position in which the door is disposed in sealing engagement with the body;
   providing the enclosed chamber with walls capable of sustaining both a negative pressure and a positive pressure within the enclosed chamber;
   moving the door to an open position;
   depositing a liquid heat transfer fluid within the enclosed chamber at a temperature sufficient to achieve torrefaction of the biomass and a first quantity of biomass material in the enclosed chamber that is substantially totally immersed in the liquid heat transfer fluid whereby heat transfer occurs between the liquid heat transfer fluid and the biomass immersed therein;
   moving the door to a closed position in sealing engagement with the body; and
   allowing the pressure within the enclosed chamber to rise to a pressure above the vapor pressure of the heat transfer fluid as a result of the expansion of liquids and gases entrained within the biomass.

26. The method as described in claim 25 wherein the heat transfer fluid used is derived from one or more plants.

27. The method as described in claim 25 wherein the process is part of a larger process for harvesting biomass energy that includes:
   providing a pellet mill;
   forming biomass into pellets; and
   the step of depositing biomass material includes biomass previously formed into pellets.

28. The method as described in claim 25 wherein the process is part of a larger process for harvesting biomass energy that includes:
   providing a gasifier and
   gasifying the torrefied biomass.

29. The method as described in claim 25 wherein the process is part of a larger process for harvesting biomass energy that includes:
   providing a syngas treatment unit and
   treating gas produced from torrefied biomass.

30. The method as described in claim 25 wherein the process is part of a larger process for harvesting biomass energy that includes:
   providing a Fischer-Tropsch Synthesis unit and
   treating gas produced from torrefied biomass with the Fischer-Tropsch Synthesis unit to produce liquefied fuel.

31. The method as described in claim 25 wherein the process is part of a larger process for utilizing the energy from the torrefied biomass that further includes:
   grinding the torrefied biomass;
   burning the biomass with an atomization nozzle.

* * * * *